(12) United States Patent
Matsuura et al.

(10) Patent No.: US 7,346,659 B2
(45) Date of Patent: Mar. 18, 2008

(54) INFORMATION PROVIDING SYSTEM AND APPARATUS AND METHODS THEREFOR

(75) Inventors: Kenichiro Matsuura, Kanagawa (JP); Hiroshi Satomi, Kanagawa (JP); Satoshi Igeta, Kanagawa (JP); Atsushi Inoue, Tokyo (JP); Kosuke Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 733 days.

(21) Appl. No.: 09/909,042

(22) Filed: Jul. 19, 2001

(65) Prior Publication Data

US 2002/0052922 A1    May 2, 2002

(30) Foreign Application Priority Data

Jul. 24, 2000    (JP)    ............................. 2000-222814

(51) Int. Cl.
*G06F 15/16*    (2006.01)
*G06F 1/12*    (2006.01)
(52) U.S. Cl. ..................... 709/206; 709/207; 455/412.1
(58) Field of Classification Search ........ 709/200–202, 709/206, 238, 245, 246, 207, 217, 218, 219; 345/752; 340/2.23, 3.54; 370/355–356, 370/392, 397, 399, 395.31; 378/142.04; 455/428, 412.1; 700/226; 715/530
See application file for complete search history.

(56) References Cited

U.S. PATENT DOCUMENTS

| | | | | |
|---|---|---|---|---|
| 4,370,645 A | * | 1/1983 | Cason et al. ................. | 345/157 |
| 4,503,428 A | * | 3/1985 | Hashimoto et al. ......... | 345/467 |
| 4,837,798 A | | 6/1989 | Cohen et al. | |
| 4,893,333 A | * | 1/1990 | Baran et al. ........... | 379/100.11 |
| 5,218,458 A | * | 6/1993 | Kochis et al. .............. | 358/448 |
| 5,283,887 A | * | 2/1994 | Zachery ...................... | 715/513 |

(Continued)

FOREIGN PATENT DOCUMENTS

EP    0 880 268 A2    11/1998

(Continued)

OTHER PUBLICATIONS

A Full-Text Retrieval System with a Dynamic Abstract Generation Function Miike, S. , et al., Anual ACM Conf. on Research and Develop. in Information Retrieval, Proceeding of the 17th Annual Intl ACM SIGIR, ISNB 0-387-19889-X, 1994, p. 152-161.*

(Continued)

*Primary Examiner*—Zarni Maung
(74) *Attorney, Agent, or Firm*—Cowan, Liebowitz & Latman, P.C.

(57) ABSTRACT

A net database retains, for each user, information about a portable terminal and user information including designation of a destination of electronic mail. A determination module determines whether the contents of electronic mail received by a mail server are displayable at the portable terminal of a destination user. If it is determined that the contents are displayable, the electronic mail is sent to the portable terminal of the destination user. If it is determined that the contents are not displayable, the determination module determines the destination of the electronic mail in accordance with the user information. A conversion module converts the electronic mail data into a form outputtable at the destination. The converted data is provided to the destination apparatus, and a notification representing this is notified to the portable terminal.

8 Claims, 29 Drawing Sheets

U.S. PATENT DOCUMENTS

| | | | |
|---|---|---|---|
| 5,303,343 A * | 4/1994 | Ohya et al. | 709/246 |
| 5,495,344 A * | 2/1996 | Callaway et al. | 358/407 |
| 5,555,100 A * | 9/1996 | Bloomfield et al. | 358/402 |
| 5,635,918 A * | 6/1997 | Tett | 340/7.29 |
| 5,675,507 A | 10/1997 | Bobo, II | |
| 5,691,708 A * | 11/1997 | Batchelder et al. | 340/7.29 |
| 5,742,905 A * | 4/1998 | Pepe et al. | 455/461 |
| 5,826,034 A * | 10/1998 | Albal | 709/239 |
| 5,859,967 A * | 1/1999 | Kaufeld et al. | 713/200 |
| 5,862,347 A * | 1/1999 | Suzuki et al. | 709/247 |
| 5,881,233 A * | 3/1999 | Toyoda et al. | 709/233 |
| 5,930,777 A | 7/1999 | Barber | |
| 5,995,597 A | 11/1999 | Woltz | |
| 6,023,700 A * | 2/2000 | Owens et al. | 707/10 |
| 6,061,502 A | 5/2000 | Ho et al. | |
| 6,092,114 A * | 7/2000 | Shaffer et al. | 709/232 |
| 6,101,320 A * | 8/2000 | Schuetze et al. | 709/206 |
| 6,104,711 A * | 8/2000 | Voit | 370/352 |
| 6,108,709 A * | 8/2000 | Shinomura et al. | 709/239 |
| 6,119,137 A * | 9/2000 | Smith et al. | 715/523 |
| 6,212,550 B1* | 4/2001 | Segur | 709/206 |
| 6,253,231 B1* | 6/2001 | Fujii | 709/206 |
| 6,279,018 B1* | 8/2001 | Kudrolli et al. | 715/540 |
| 6,330,628 B1 | 12/2001 | Motoyama | |
| 6,389,129 B1* | 5/2002 | Cowan | 379/221.03 |
| 6,430,272 B1* | 8/2002 | Maruyama et al. | 379/88.22 |
| 6,477,565 B1* | 11/2002 | Daswani et al. | 709/217 |
| 6,493,105 B1 | 12/2002 | Onuma | |
| 6,493,107 B1 | 12/2002 | Toyoda et al. | |
| 6,546,417 B1 | 4/2003 | Baker | |
| 6,618,763 B1* | 9/2003 | Steinberg | 709/246 |
| 6,625,642 B1* | 9/2003 | Naylor et al. | 709/206 |
| 6,629,130 B2* | 9/2003 | Mertama et al. | 709/206 |
| 6,633,630 B1* | 10/2003 | Owens et al. | 379/93.24 |
| 6,683,698 B2 | 1/2004 | Toyoda et al. | |
| 6,684,088 B1 | 1/2004 | Halahmi | |
| 6,775,026 B1 | 8/2004 | Kato | |
| 7,076,241 B1* | 7/2006 | Zondervan | 455/412.1 |
| 2001/0013871 A1* | 8/2001 | Kucmerowski | 345/581 |
| 2002/0016818 A1 | 2/2002 | Kirani et al. | |

FOREIGN PATENT DOCUMENTS

| | | | |
|---|---|---|---|
| EP | 1 058 199 A2 * | 6/2000 | |
| WO | WO 98/58332 | * 12/1998 | |
| WO | WO 00/40000 | 7/2000 | |

OTHER PUBLICATIONS

Abstracting of Legal Cases: The Salomon Experrience, Moens, M., et. al., Intl Conf. on Artificial Intelligence and Law Proceedings, Australia, ISBN 0-89791-924-6, 1997, 114-122.*

A trainable Document Summarizer, Kupiec, J., et. al., Xerox Research Center, Anual ACM Conf. on Research and Develop. in Information Retrieval, Proceeding of the 17th Annual Intl ACM SIGIR, ISNB 0-89791-714-6, 1995, p. 68-73.*

IEEE 100 The Authoritative Dictionary of IEEE Standards Terms 7th Ed., 2000, p. 650 and 682-683.*

* cited by examiner

706b USER HONE INFORMATION TABLE

706c USER OFFICE INFORMATION TABLE

| USER ID |
| --- |
| OFFICE ZIP CODE |
| OFFICE ADDRESS |
| NAME OF YOUR COMPANY |
| NAME OF YOUR DEPARTMENT |
| OFFICE TELEPHONE NUMBER |
| OFFICE FAX NUMBER |
| OFFICE MAIL ADDRESS |

FIG. 11

706e USER CONVERSION SETTING TABLE

| |
|---|
| USER ID |
| DISPLAY ON WEB : ON |
| FUNCTION OF CONVERTING IMAGE FORMAT EXCEPT JPEG AND GIF INTO JPEG FORMAT WHEN ATTACHED IMAGE IS DISPLAYED ON WEB : ON |
| FUNCTION OF DISPLAYING ATTACHED WORDPROCESSOR DOCUMENT ON WEB : ON |
| USE PAY CONVERSION FOR WEB DISPLAY |
| NOTIFY BY MAIL UPON UPLOADING |
| FUNCTION OF SENDING ABSTRACT OF MAIL TEXT TO PORTABLE TERMINAL WHEN THE NUMBER OF CHARACTERS OF MAIL TEXT IS LARGER THAN THE MAXIMUM NUMBER OF DISPLAYABLE CHARACTERS OF PORTABLE TERMINAL : ON |
| FUNCTION OF CONVERTING ATTACHED IMAGE TO DISPLAYABLE SIZE AND SENDING CONVERTED IMAGE TO PORTABLE TERMINAL : ON |
| FUNCTION OF DISPLAYING ABSTRACT OF ATTACHED WORDPROCESSOR DOCUMENT : ON |
| USE PAY CONVERSION FOR DISPLAY AT PORTABLE TERMINAL |
| TRANSFER TO FAX : ON |
| TRANSFER ATTACHED IMAGE TO FAX : ON |
| TRANSFER ATTACHED WORDPROCESSOR DOCUMENT TO FAX : ON |
| TRANSFER DESTINATION FAX (HOME, OFFICE, OR PORTABLE TERMINAL) |
| ALLOWABLE NUMBER OF FAX OUTPUT PAGES |
| USE PAY CONVERSION FOR FAX DISPLAY |
| NOTIFY DESTINATION UPON SENDING FAX |

FIG. 13

706g PORTABLE TERMINAL PERFORMANCE TABLE

| PORTABLE TERMINAL MODEL NUMBER |
| --- |
| COLOR DISPLAY ENABLE FLAG |
| NUMBER OF COLORS |
| BIT COUNT PER COLOR |
| DISPLAYABLE MAXIMUM SIZE (VERTICAL) |
| DISPLAYABLE MAXIMUM SIZE (HORIZONTAL) |
| DISPLAYABLE IMAGE FORMAT (MIME) |
| DISPLAYABLE MAXIMUM CHARACTER COUNT (BYTE) |

FIG. 19

DESIGNATE OFFICE TO WHICH FAX/MAIL IS TRANSFERRED

ZIP CODE : ⎯620

ADDRESS : ⎯621

NAME OF YOUR COMPANY : ⎯622

NAME OF YOUR DEPARTMENT : ⎯623

TELEPHONE NUMBER : ⎯624

FAX NUMBER : ⎯625

MAIL ADDRESS : ⎯626

13 UNREAD MAIL MESSAGES

| | From | Subject | |
|---|---|---|---|
| 1 | TShoutoku@AAA.go.jp | Hello | |
| 2 | HItou@BBB.ne.jp | Good Morning | |
| 3 | TItagaki@CCC.Co.jp | Good Afternoon | |
| 4 | YFukuzawa@AAA.co.jp | Good Evening | |
| 5 | INitobe@BBB.go.jp | Welcome | ~660 |
| 6 | SMurasaki@CCC.ne.jp | GENJI | |
| 7 | SNatume@AAA.ne.jp | I | |
| 8 | NOda@BBB.go.jp | IN OWARI | |
| 9 | HToyotomi@CCC.co.jp | IN OSAKA | |
| 10 | ITokugawa@AAA.go.jp | IN EDO | |

NEXT 3 MAIL MESSAGES ~661

INFORMATION PROVIDING SYSTEM AND APPARATUS AND METHODS THEREFOR

FIELD OF THE INVENTION

The present invention relates to an information providing system and apparatus, and methods therefor, which provide information to a user using an electronic mail system.

BACKGROUND OF THE INVENTION

In recent years, information providing services using the Internet are available upon preparing communication infrastructures and developing information communication techniques. The information providing services using the Internet can provide multimedia information including images and sounds as well as information using letters.

A user who receives an information providing service via the Internet registers a mail account for using electronic mail and can perform communication using electronic mail and exchange information with other users.

Electronic mail information is generally represented by text. However, a binary file such as application data (document file) prepared by a user can be attached to electronic mail information by a technique for encoding the binary file into text data and a technique for decoding encoded text data.

The radio communication infrastructures have been prepared, and information communication techniques have been developed. In addition, terminals using these infrastructures and information communication techniques have been downsized. Mobile portable terminals such as portable telephones as well as desktop personal computers can be connected to the Internet. As a result, users using electronic mail with portable terminals have abruptly been increasing.

A means for acquiring information circulated in the Internet is not limited to a personal computer but can extend to a portable terminal and electronic mail terminal. These terminals have a variety of limitations such as the limitation of receivable information quantity, the limitation of display capacity of a terminal such as a display size, color, and resolution, the unique physical limitation, and the unique limitation on capacity.

Under these circumstances, unless information communication is performed upon understanding the environments of the sender and recipient in advance, reception information which cannot be processed on the receiving side cannot be received and is hence discarded.

Communication using electronic mail with a portable terminal via the Internet is allowed. However, if a mail recipient does not notify a mail sender of limitations on information content (e.g., attachment of a computer electronic file or binary file) and the number of characters processed per mail, information which cannot be properly received (discarded before arrival of mail to the terminal) by the recipient may be generated.

Some portable terminal mail addresses can make a user imagine that it is a portable terminal depending on its domain name. However, the portable terminal mail address belongs to a standard Internet mail address system. Some portable terminal users use as a portable terminal mail address a mail address used at a terminal (e.g., a desktop personal computer) having electronic mail reception limitations different from those of the portable terminal. A transmitting side cannot easily decide the information reception capacity of the recipient terminal. It is, therefore, very difficult for an electronic mail sender to predict the recipient environment and send information processed to be received by the recipient.

Electronic mail messages from which information is omitted are frequently transmitted via portable terminals at the present. Users have no choice for any means for avoiding this.

To avoid the above situation, a technique has already been available, in which electronic mail to a portable terminal is transferred to one account on a World Wide Web server before reception of the mail at the portable terminal, and the mail is browsed via the World Wide Web mechanism. This technique cannot cope with browsing a binary file or acquiring data although the limitation on the number of receivable characters at a portable terminal is canceled.

Assume that an electronic mail sender attaches a document file or the like prepared using any application. In this case, a user using only the portable terminal as an Internet connection means may be able to browse this document due to the limitations on the display capacity of the portable terminal.

In browsing mail attached with a document via the World Wide Web mechanism, the electronic mail information supposed to be sent to the portable terminal is transferred to another mailbox. The electronic mail transmitted to the user cannot be entirely checked by the electronic mail arriving at the portable terminal. The portable terminal user must frequently check his own mail information on the World Wide Web.

As described above, a variety of limitations are imposed on portable terminal users in use of electronic mail with portable terminals.

SUMMARY OF THE INVENTION

The present invention has been made to solve the conventional problems, and has as its object to reduce limitations on the contents of transmission information and allow a variety of information providing services in use of data transmission with a portable terminal.

According to one aspect of the present invention, the foregoing object is attained by providing an information providing apparatus comprising: reception means for receiving transmission information to a user; determination means for determining whether contents of the transmission information received by said reception means are displayable at a portable terminal owned by the user; sending means for sending the transmission information to the portable terminal when said determination means determines that the contents are displayable; decision means for deciding on the basis of user information of the user a destination of the transmission information received by said reception means when said determination means determines that the contents are not displayable; designation means for designating conversion such that data contained in the transmission information matches a format of the destination; and providing means for providing to the destination data format-converted on the basis of designation of said designation means.

According to another aspect of the present invention the foregoing object is attained by providing an information providing system comprising: transmission means for transmitting desired information as transmission information; determination means for determining whether contents of the transmission information are displayable at a portable terminal owned by a destination user; sending means for sending the transmission information to the portable terminal when said determination means determines that the contents are displayable; decision means for deciding a destination of the transmission information when said determination means determines that the contents are not displayable; conversion means for converting data contained in the transmission information into a format suitable for the destination; and providing means for providing to the destination data format-converted by said conversion means.

Further, according to another aspect of the present invention the foregoing object is attained by providing an information providing method comprising: the reception step of receiving transmission information to a user; the determination step of determining whether contents of the transmission information received in the reception step are displayable at a portable terminal owned by the user; the sending step of sending the transmission information to the portable terminal when it is determined in the determination step that the contents are displayable; the decision step of deciding on the basis of user information of the user a destination of the transmission information received in the reception step when it is determined in the determination step that the contents are not displayable; the designation step of designating conversion such that data contained in the transmission information matches a format of the destination; and the providing step of providing to the destination data format-converted on the basis of designation in the designation step.

Further, according to another aspect of the present invention the foregoing object is attained by providing an information providing method comprising: the transmission step of transmitting desired information as transmission information; the determination step of determining whether contents of the transmission information are displayable at portable terminal owned by a destination user; the sending step of sending the transmission information to the portable terminal when it is determined in the determination step that the contents are displayable; the decision step of deciding a destination of the transmission information when it is determined in the determination step that the contents are not displayable; the conversion step of converting data contained in the transmission information into a format suitable for the destination; and the providing step of providing to the destination data format-converted in the conversion step.

Furthermore, according to the present invention, a computer readable medium storing control program for a computer to execute the above information processing method is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view showing the data configuration of a user conversion setting table;

FIG. 13 is a view showing the data configuration of a portable terminal performance table;

FIG. 19 is a view showing a dialog for designating a transfer destination in the Web server in the net mail service according to this embodiment;

FIG. 22 is a view showing a cover page in a display state of reception mail in the Web server in the net mail service according to this embodiment;

DETAILED DESCRIPTION OF THE PREFERRED EMBODIMENTS

Preferred embodiments of the present invention will now be described in detail in accordance with the accompanying drawings.

An embodiment will describe the following information providing system. In providing information to a user using an electronic mail system according to the present invention, when an electronic mail receiving terminal is a portable terminal, and information which cannot be mapped or displayed at the portable terminal, the information providing system informs a user of subject information and a method of acquiring the information. Information which cannot conventionally be mapped or displayed due to the limitations of the terminal can be provided to the recipient in a variety of forms.

<System Configuration>

A service system (to be referred to as a net mail service hereinafter) to be described in this embodiment is comprised of a mail server for receiving mail for portable terminals installed in a portable terminal service company such as a portable telephone company (this server will be simply referred to as a mail server hereinafter), a module for determining whether information can be represented at a portable terminal, preparing a document suitable for a medium wanted by a user in accordance with user settings, and transferring the document to the medium wanted by the user (this module will be referred to as a determination module hereinafter), a conversion module for converting a given specific format into another specific format (this module will simply be referred to as a conversion module hereinafter), a module for setting user information and a medium wanted by a user (this module will be referred to as a setting module hereinafter), and a memory for storing data (this memory will be referred to as a net database hereinafter).

Figure 1:
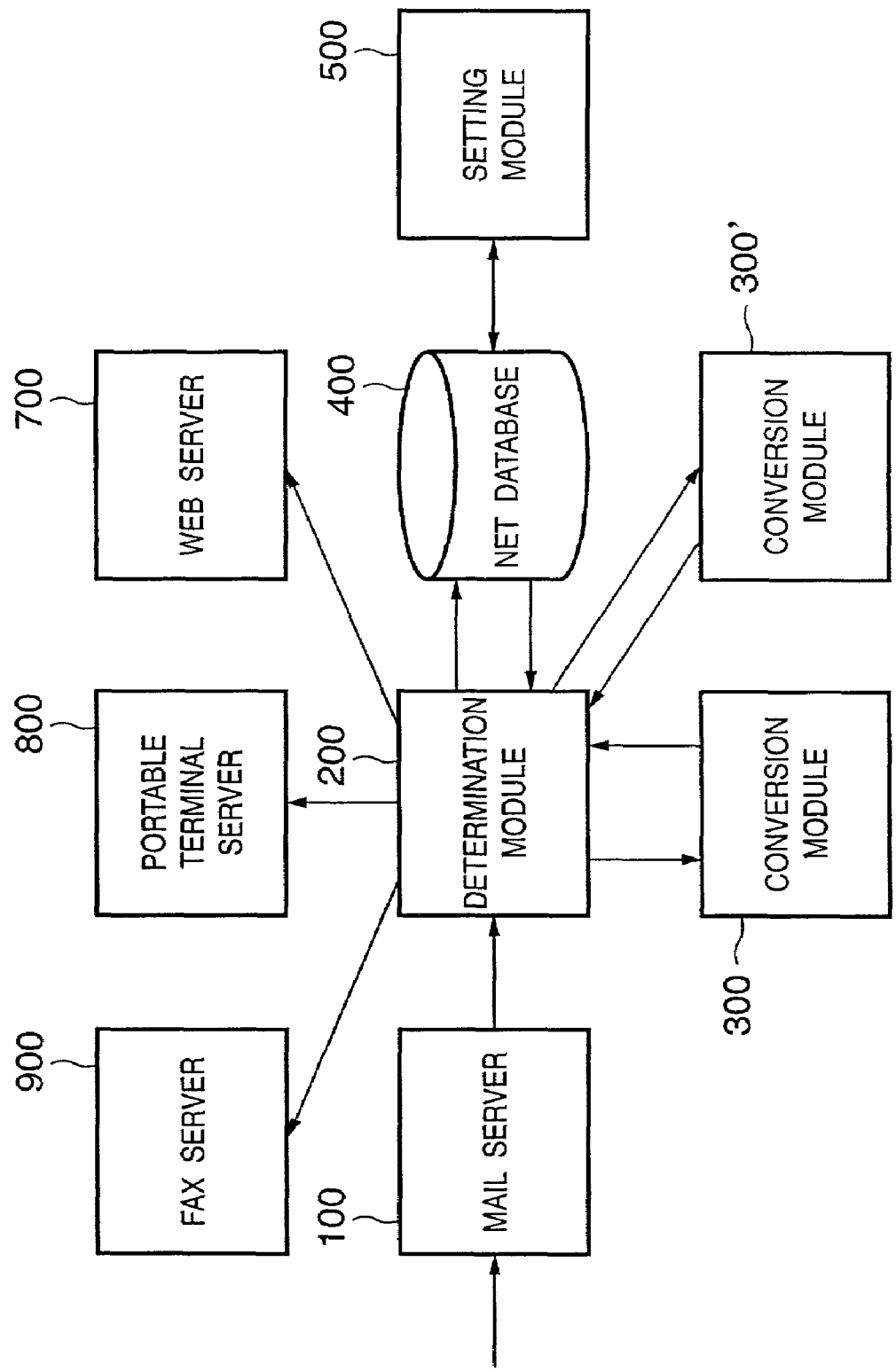
FIG. 1 is a block diagram showing the schematic arrangement of an information providing service system according to an embodiment.

FIG. 1 is a block diagram for explaining the schematic arrangement of the information providing service according to this embodiment. Referring to FIG. 1, reference numeral 100 denotes a mail server; 200, a determination module; 300 and 300', conversion modules; 500, a setting module; and 400, a net database. When the determination module 200 determines that mail received by the mail server 100 cannot be represented at a portable terminal, the determination module 200 divides mail into mail text and each attached file and transfers the divided data to the appropriate conversion modules 300 and 300'. The determination module 200 prepares a document suitable for each medium using the data converted by the corresponding conversion module. The determination module 200 sends the data to the respective modules via a Web server 700, portable terminal server 800, and FAX server 900. The determination module 200 allows these servers to display and output the data contents. The determination module 200 selects an appropriate conversion module in accordance with the setting contents in a user conversion setting table (to be described later). The setting contents can be prepared or changed by the setting module 500.

In this embodiment, in order to provide a more flexible service to a user, the user can set information in the setting module 500 to implement transfer of electronic mail to the designated Web server, FAX machine, or portable terminal. The setting module 500 can be omitted for fixed services. An example of the fixed services is to configure a system in which the transfer destination of electronic mail is fixed to a predetermined Web server, and the user traces the URL links to acquire his mail.

The mail server 100 may or may not operate on a server in which the determination module 200 is operating. A gateway for performing conversion between SMTP mail and mail of another methods may be used for the mail server 100. In this case, the functions of the determination module 200 are added to the functions of the gateway.

The determination module 200 receives mail having been received by the mail server 100 and determines whether the mail can be represented at the portable terminal of the user. If a portion which cannot be represented at the portable terminal is found, this mail is divided for the respective formats (divided into mail text and each attached file). The determination module 200 instructs the appropriate conversion modules 300 and 300' to convert the respective divided portions into formats suitable for the media wanted by the users. A conversion module which is selected by the determination module 200 is determined by looking up the user conversion setting table stored in the net database 400. By using the data returning from the conversion modules 300 and 300', the determination module 200 prepares documents for media wanted by users.

When the determination module 200 receives mail having been received by the mail server 100 determines that the mail can be represented on the portable terminal of the user, the mail is normally sent to the portable terminal of the user via the portable terminal server 800.

The conversion modules 300 and 300' are filters for converting specific formats to other specific formats. An example of the conversion module is a simplest module for converting the TIFF format as the image format to the JPEG format as another image format. The modules 300 and 300' perform conversion between specific formats. A plurality of conversion modules are used in accordance with the number of formats which can be processed by the determination module. The conversion modules 300 and 300' are illustrated in FIG. 1. Three or more conversion modules may be used, as a matter of course.

The setting module 500 serves as a mechanism for accepting user conversion settings and storing them in the net database 400. In this embodiment, the setting module 500 is activated by the Web server 700 using CGI but may be activated by a dedicated terminal or voice guidance by telephone. Setting and a change in settings can, of course, be made by the dedicated terminal or the voice guidance by telephone. This embodiment aims at processing mail for a portable terminal, and user registration is done at the time of purchase of a portable terminal. User registration by the setting module will not be described. However, it is not impossible to register a user by the setting module. When a portable terminal user additionally subscribes a mail service, user registration may be done via the setting module.

The net database 400 stores user registration contents, user conversion settings, charge information, and data contained in mail.

The Web server 700, portable terminal server 800, and FAX server 900 serve as information providing means for media which represent the conversion results. In this embodiment, the Web server 700 is also used to access the setting module 500. The setting module 500 and the Web server 700 can be present in physically different machines or single machine.

According to the above, data to be transferred to a portable terminal is transmitted to the portable terminal server 800, and data to be transferred to the FAX machine is transmitted to the FAX server 900. However, these data may be directly transmitted to the portable terminal and FAX machine.

According to the purpose of this embodiment, mail directed to a portable terminal is converted and provided to the portable terminal. A conversion result representing that information is uploaded to the Web server 700 can be notified to the portable terminal.

In this embodiment, as media for representing the conversion results, media connected to the Web server 700, portable terminal server 800, and FAX server 900 are selected. However, the media are not limited to them. Any other media can be used. For example, a conversion module for converting characters to sounds can be arranged. In this case, a voice telephone can be selected as a medium which represents the conversion result. The portable terminal and facsimile machine respectively connected to the portable terminal server 800 and FAX server 900 need not be dedicated ones.

As examples of services implemented by the above system, the following services will be mainly described in this embodiment.

(1) Change in registration of user conversion settings: performs setting of a transfer destination used in a mail conversion service, and registration and change of conversion settings.

(2) Data display by Web: displays mail information converted into the Web format in accordance with user settings.

(3) Data display at portable terminal: displays mail information converted for a portable terminal in accordance with user settings.

(4) Data display at FAX machine: outputs mail information converted for a FAX machine in accordance with user settings.

(5) Mail conversion service: changes the mail contents into a format suitable for another medium in accordance with settings.

These services will be described in detail later. The services and functions of this embodiment are not limited to these.

<Arrangement of Mail Server>

Figure 2:
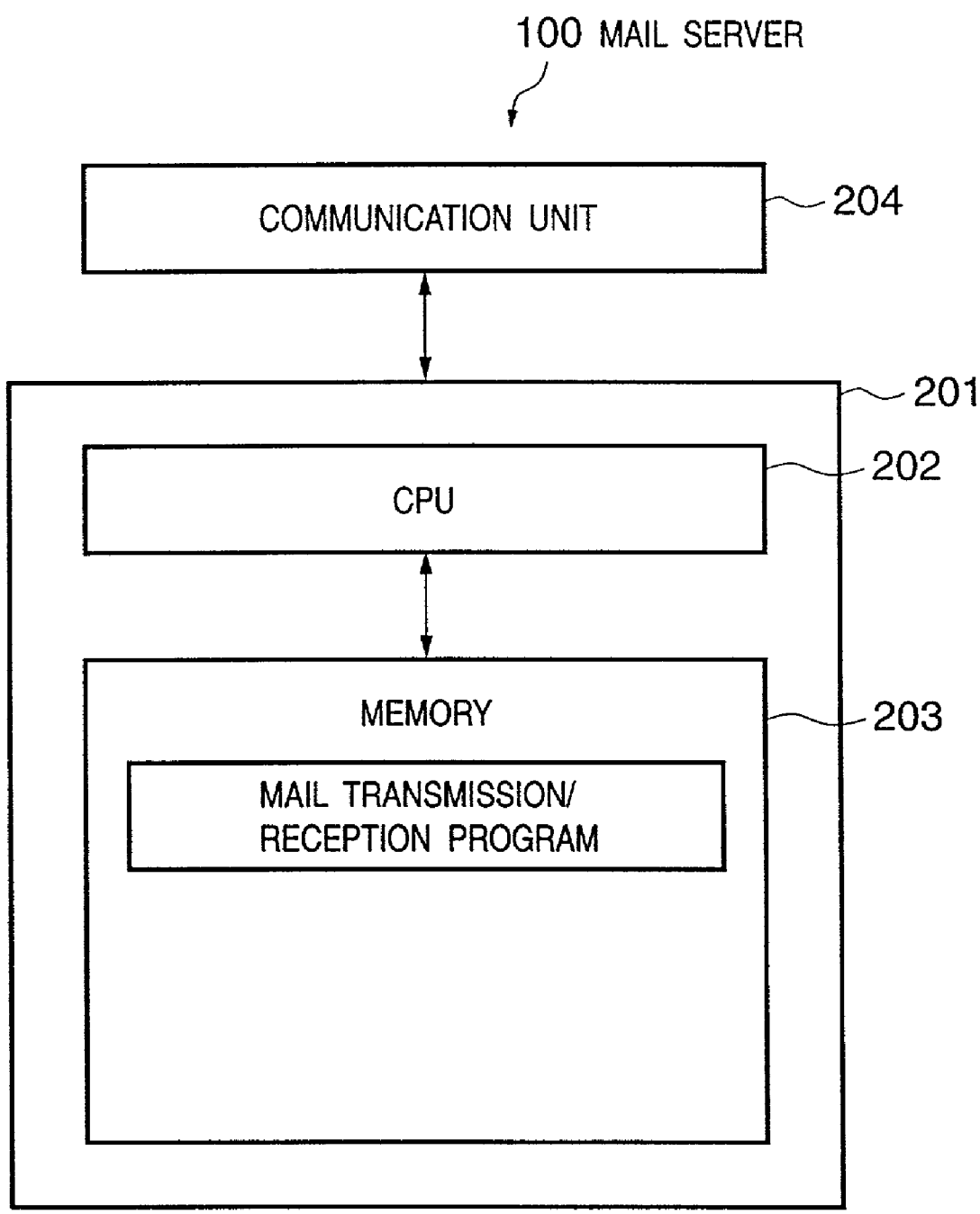
FIG. 2 is a block diagram showing the schematic arrangement of a mail server.

FIG. 2 is a block diagram showing the schematic arrangement of a mail server. Reference numeral 201 denotes a controller including a CPU 202 and memory 203. The CPU 202 executes a mail transmission/reception program stored in the memory 203 to implement control of transmission/reception of mail. Reference numeral 204 denotes a communication unit 204 which exchanges mail data via a channel. The communication unit 204 is used, when the reception mail is stored in the net database and data on the net database is accessed and transmitted.

<Arrangement of Determination Module>

Figure 3:
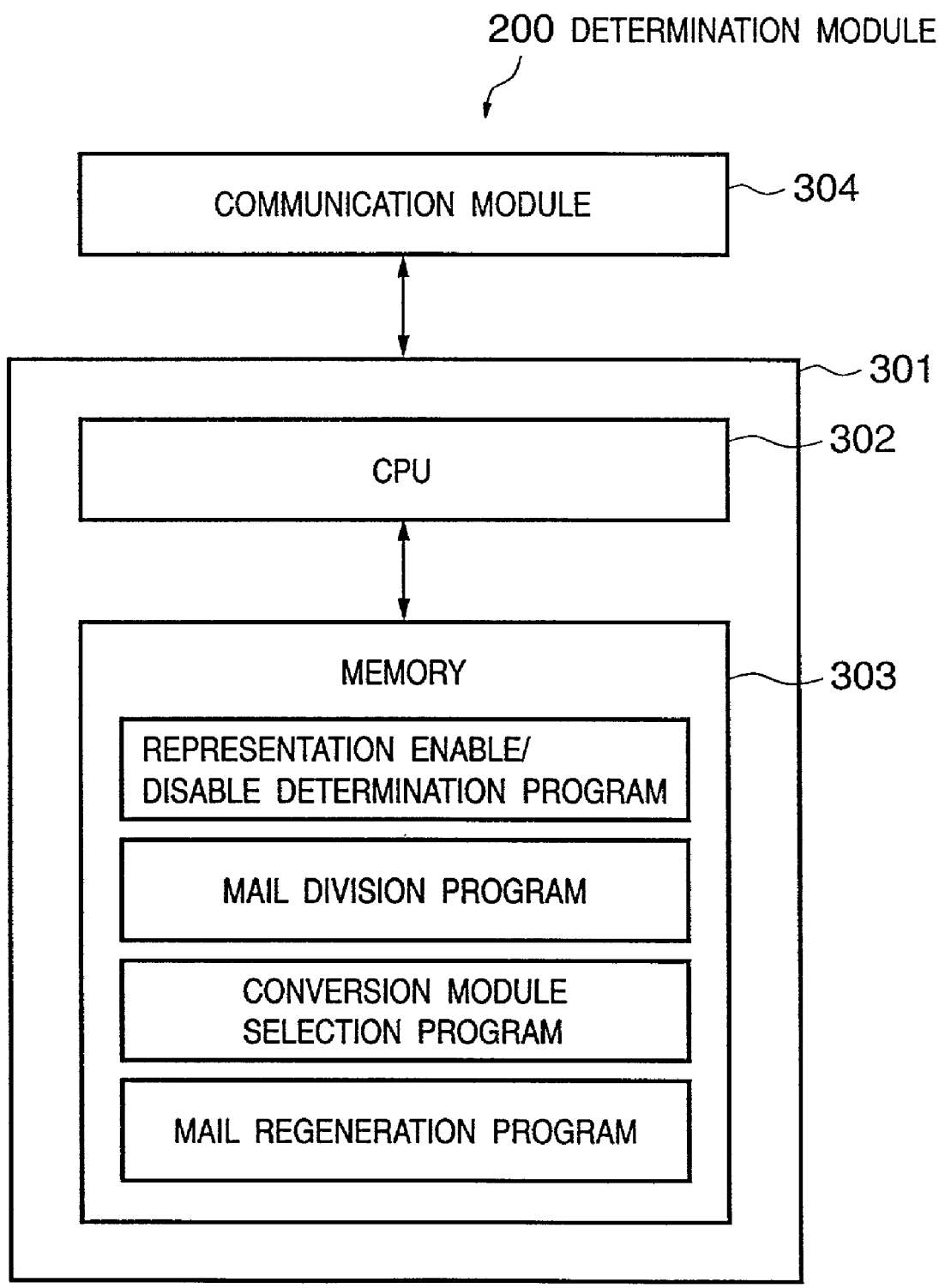
FIG. 3 is a block diagram showing the schematic arrangement of a determination module.

FIG. 3 is a block diagram showing the schematic arrangement of a determination module. Reference numeral 301 denotes a controller including a CPU 302 and memory 303. The CPU 302 executes a representation enable/disable determination program for determining whether information is represented at a portable terminal, a mail division program, a conversion module selection program, and a mail regeneration program, all of which are stored in the memory 303. The CPU 302 realizes determinations about data conversion.

Reference numeral 304 denotes a communication unit used to access the data on the net database, when extracting mail received and stored in the net database, and adding processed data to the net database. This communication unit is also used to exchange data with other modules. In this embodiment, the determination module 200 also arbitrates data access to the net database from other modules or other servers.

<Arrangement of Conversion Module>

Figure 4:
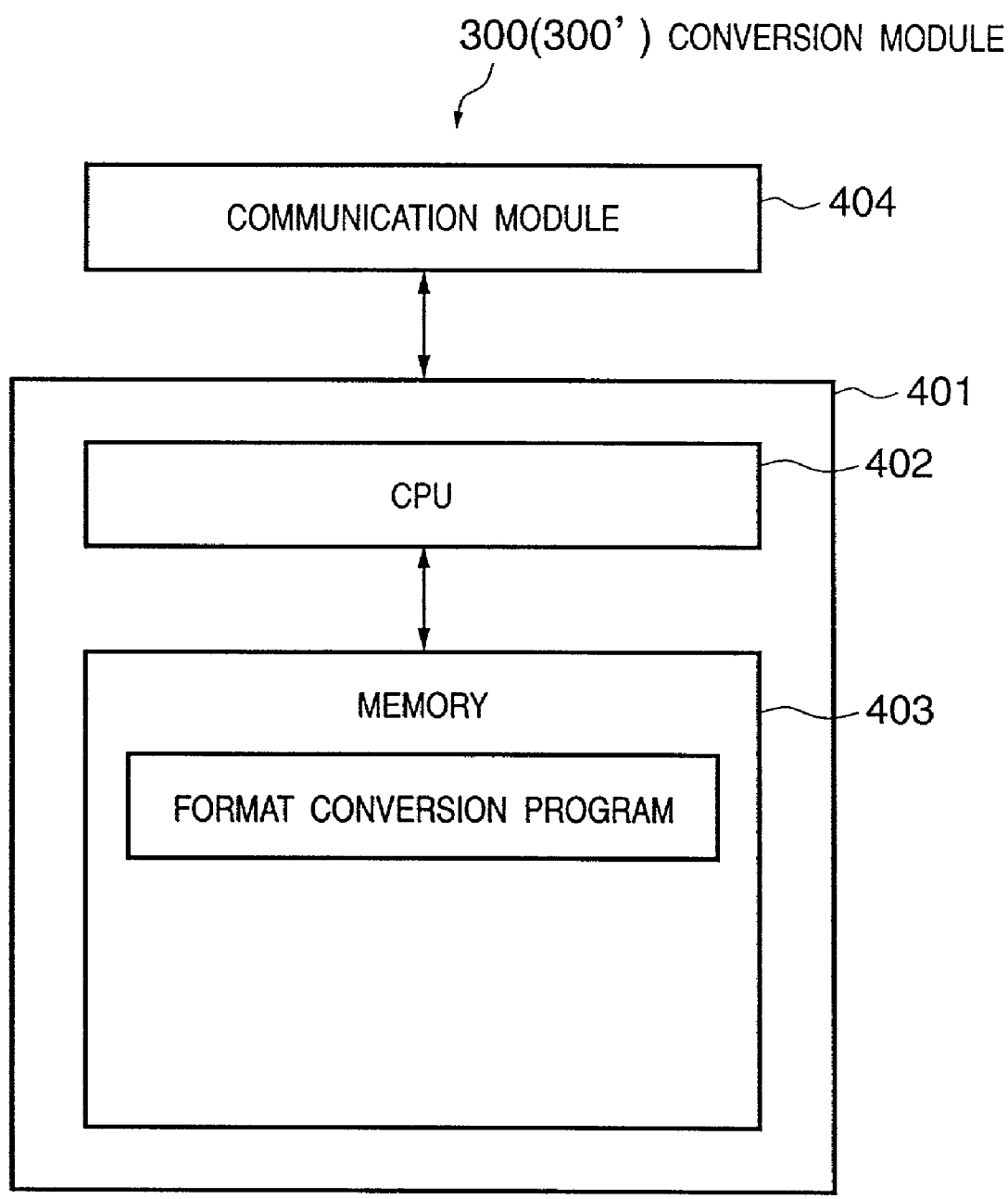
FIG. 4 is a block diagram showing the schematic arrangement of a conversion module.

FIG. 4 is a block diagram showing the schematic arrangement of a conversion module. Reference numeral 401 denotes a controller including a CPU 402 and memory 403. The CPU 402 executes a format conversion program stored in the memory 403 to implement conversion of data into a predetermined format. Reference numeral 404 denotes a communication unit used to access data on the net database when acquiring data before conversion from the net database, and storing data before conversion from the net database, and storing the converted data in the net database. This communication unit is also used to exchange data with other modules.

<Arrangement of Setting Module>

Figure 5:
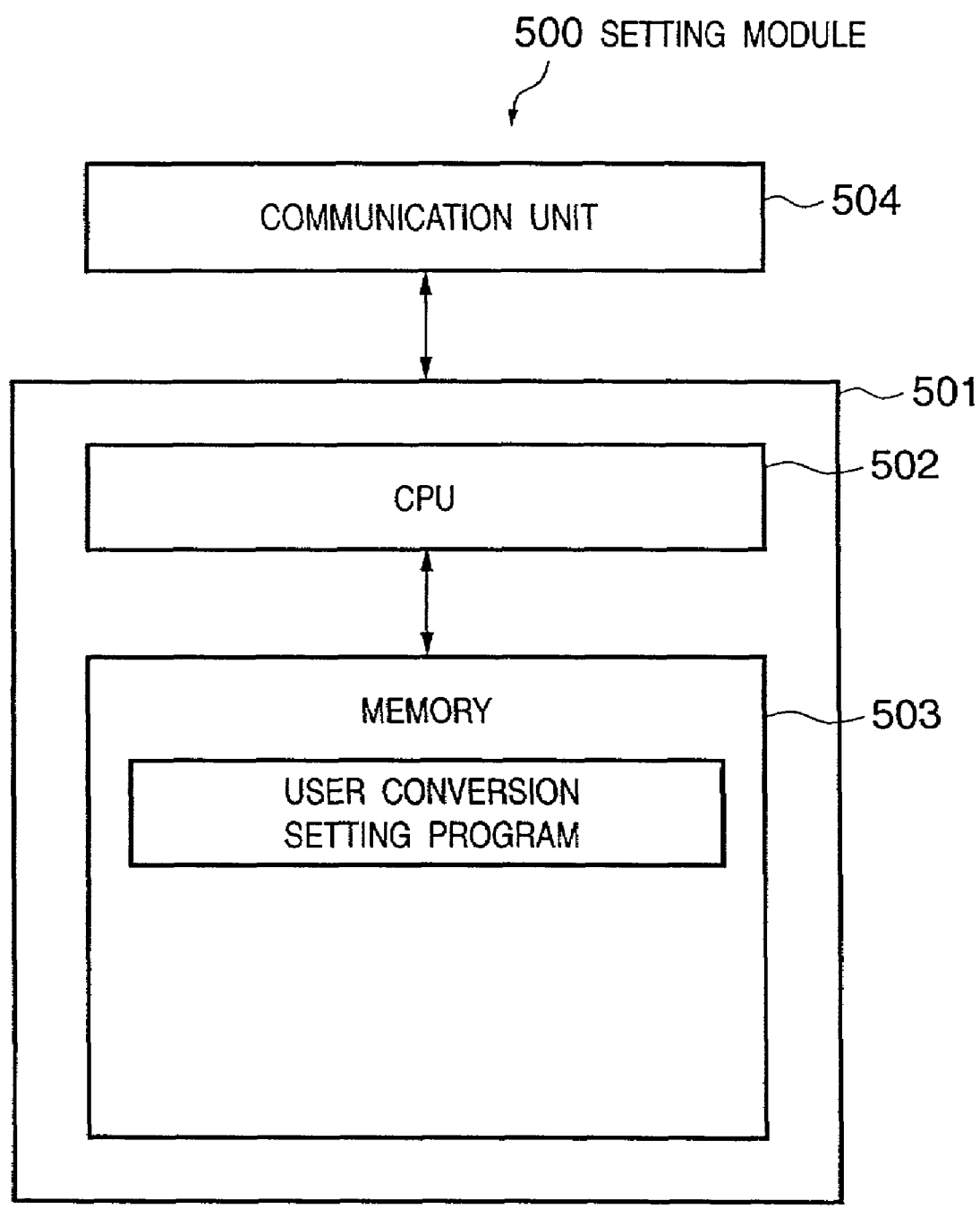
FIG. 5 is a block diagram showing the schematic arrangement of setting module.

FIG. 5 is a block diagram showing the schematic arrangement of a setting module. Reference numeral 501 denotes a controller including a CPU 502 and memory 503. The CPU 502 executes a user conversion setting program stored in the memory 503 to realize a change in user conversion settings. Reference numeral 504 denotes a communication unit used to access data on the net database when acquiring current user conversion settings from the net database, and storing the change result in the net database. This communication unit is also used when interacting with a user via a channel to receive an instruction about setting contents.

<Arrangement of Net Database>

Figure 6:
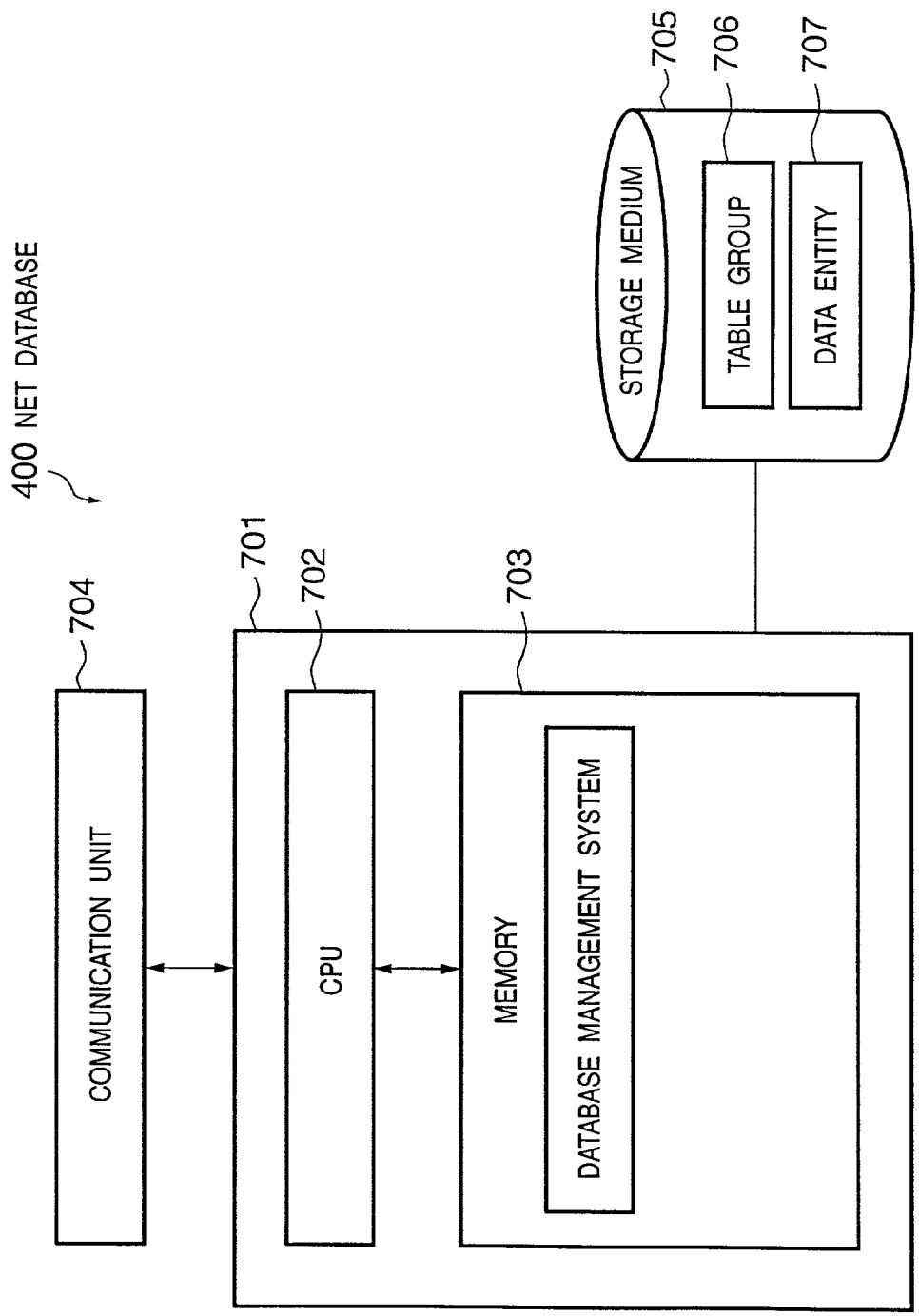
FIG. 6 is a block diagram showing the schematic arrangement of a net database.

FIG. 6 is a block diagram showing the schematic arrangement of a net database. Reference numeral 701 denotes a controller including a CPU 702 and memory 703. The CPU 702 executes a database management system stored in the memory 703 to implement management of data stored in a storage medium 705. Reference numeral 704 denotes a communication unit used to exchange data with other modules via a channel. The storage medium 705 stores data managed by the database management system. Examples of data to be stored are a table group 706 of user information and the like and a data entity 707 such as mail data.

The table group 706 includes a user information table (FIG. 7), user home information table (FIG. 8), user office information table (FIG. 9), user portable terminal information table (FIG. 10), user conversion setting table (FIG. 11), conversion module table (FIG. 12), and portable terminal performance table (FIG. 13).

Figure 7:
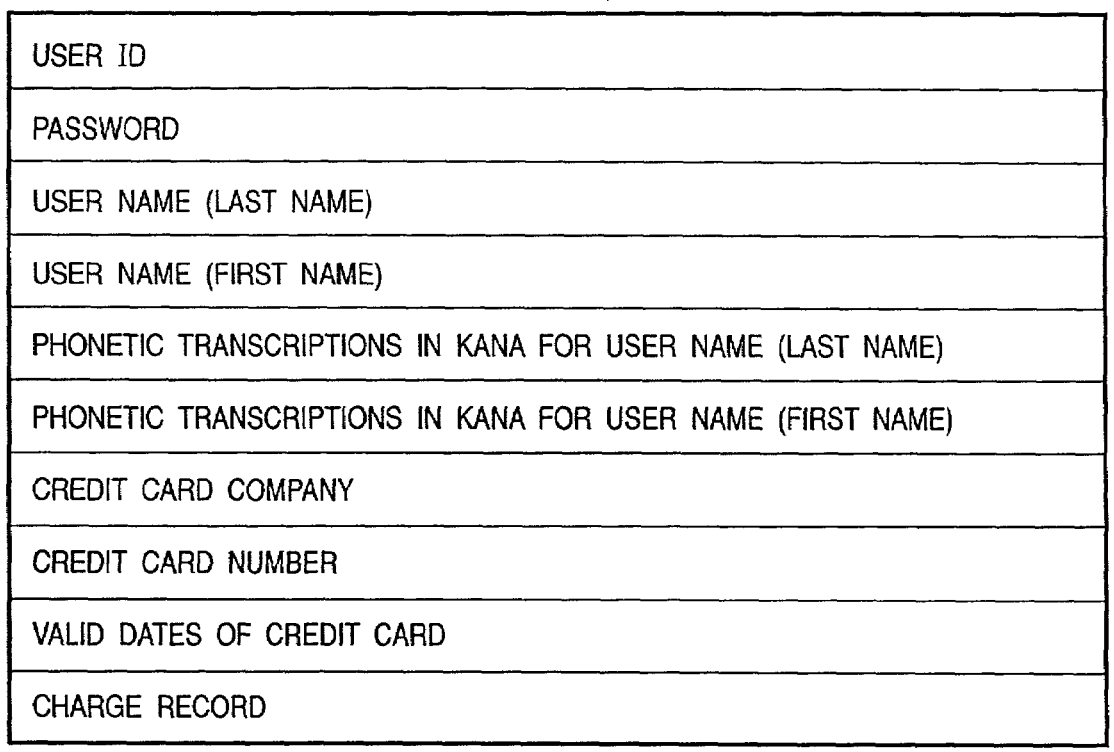
FIG. 7 is a view showing the data configuration of a user information table.

FIG. 7 is a view showing the data configuration of a user information table 706*a*. The user information table 706*a* is generated and recorded in user registration and stores an ID and password used for user authentication, credit card information and charge records for user charge, and the like. The ID (to be referred to as a user ID hereinafter) used for user authentication can be a code that recognizes a portable terminal, e.g., a portable terminal telephone number without any problem. In the following description, the user ID is defined to match the portable terminal telephone number.

Figure 8:
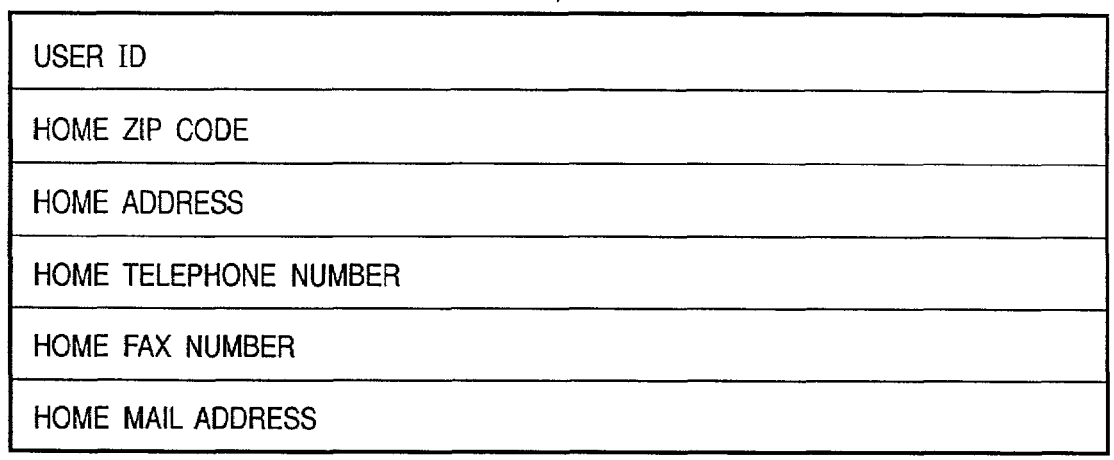
FIG. 8 is a view showing the data configuration of a user home information table.

FIG. 8 is a view showing the data configuration of a user home information table 706*b*. The user home information table 706*b* is generated and recorded at the time of user registration or use of the net mail service. The user home information table 706*b* stores a home telephone number and home address of the user, and corresponding medium IDs (e.g., a home FAX number and home mail address).

Figure 9:
FIG. 9 is a view showing the data configuration of a user office information table.

FIG. 9 is a view showing the data configuration of a user office information table 706*c*. The user office information table 706*c* is generated and recorded at the time of user registration or use of the net mail service. The user office information table 706*c* stores an office telephone number and office address of the user and corresponding medium IDs (e.g., an office FAX number and office mail address).

Figure 10:
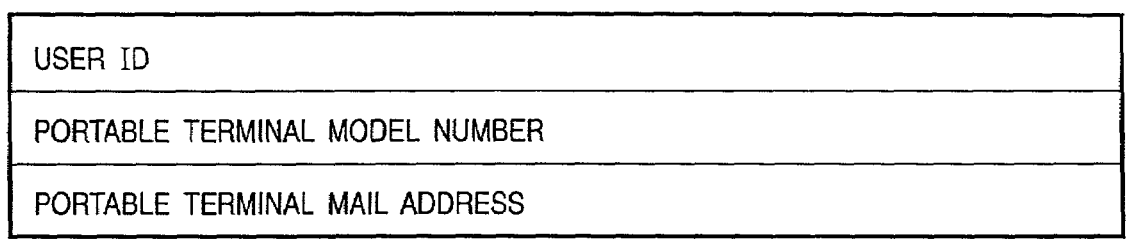
FIG. 10 is a view showing the data configuration of a user portable terminal information table.

FIG. 10 is a view showing the data configuration of a user portable terminal information table 706*d*. The user portable terminal information table 706*d* is generated and recorded at the time of user registration and use of the net mail service. The user portable terminal information table 706*d* stores information about the portable terminal of the user.

FIG. 11 is a view showing the data configuration of a user conversion setting table 706e. The user conversion setting table 706e sets whether information is displayed at the Web server 700 and FAX server 900 and so sets as to send appropriate information to an appropriate device in use of this service.

The user can select display at the Web server 700 and FAX server 900 via the setting module 500. The user can select a display format for an attached document. When the selected format data are sent to the Web server 700 and FAX server 900, a notification mail is sent to the portable terminal of the user via the portable terminal server 800 to inform the data sending are done.

Assume that display at the Web server is selected and that mail attached with an image file is received. Image formats supported by a Web browser are generally limited to JPEG and GIF. In this case, the user must have image display software corresponding to the format of an attached image, which is different from the JPEG and GIF formats. When a "function of converting an image format except JPEG and GIF into the JPEG format when an attached image is displayed on the Web: ON" is selected, the attached image can be converted into a JPEG image and displayed on the Web browser. A notification representing that the mail is uploaded to the Web server is sent to the portable terminal of the user via the portable terminal server 800 together with the mail text which can be checked on the portable terminal.

The above sequence is similarly done when a wordprocessor document is attached. Note that image formats and wordprocessor documents whose conversion is supported are some of the disclosed formats. Note also that any format can be installed if it is disclosed.

Some formats not disclosed require pay conversion, and whether a pay conversion module is allowed can be selected.

The user need not select one of the Web server 700 and FAX server 900, but can select a plurality of media or designates to display or output one mail message to all media. The contents to be displayed on the plurality of media need not be identical. For example, a mail text can be uploaded to the Web server; the whole text of a wordprocessor document can be output via the FAX machine; and a notification representing that the mail text is uploaded to the Web server, a notification representing that the wordprocessor document is output to the FAX machine, and the abstract of the wordprocessor document can be sent to the portable terminal (telephone).

The data entity 707 contains data of sent mail, divided mail data, data converted suitably for each medium by a conversion module, a document prepared for each medium, and the like. Since the divided mail data is stored as a data entity, conversion can be done with a user interactively. Assume that data such as a wordprocessor document cannot be browsed without using a pay conversion module. A notification representing only that the wordprocessor document is received is sent to the portable terminal. When the user accesses the Web server and selects to display the wordprocessor document, the document is sent to the pay conversion module and can be browsed.

Figure 12:
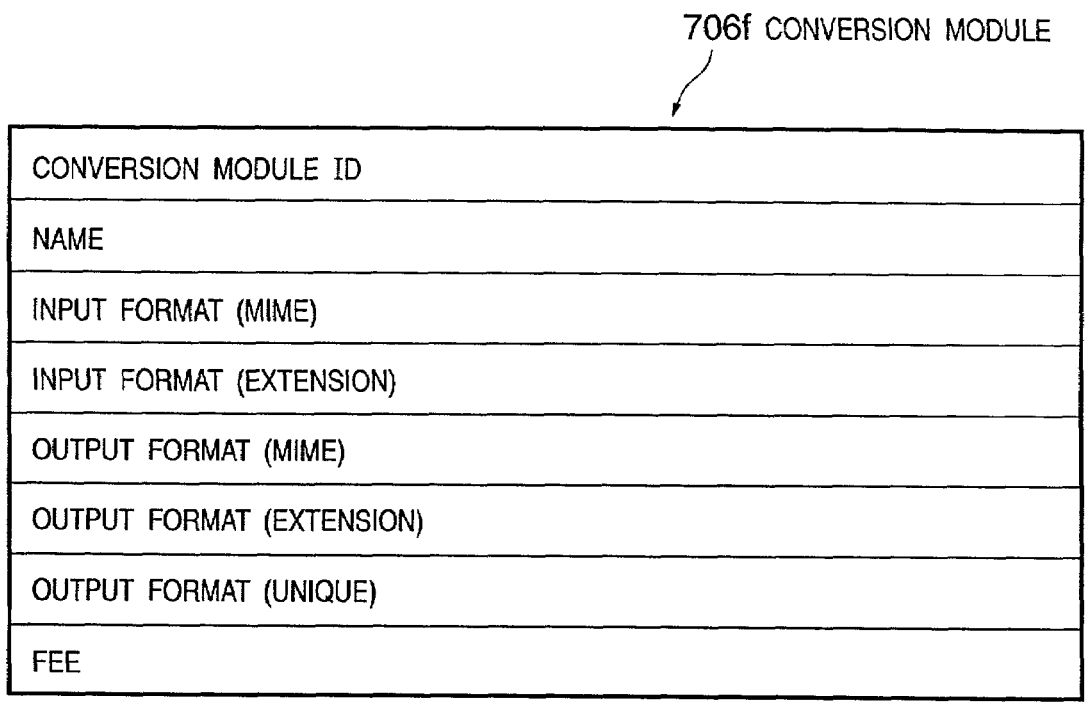
FIG. 12 is a view showing the data configuration of a conversion module table.

FIG. 12 is a view showing the data configuration of a conversion module table 706f. The conversion module table 706f is used to describe the characteristics of each conversion module. The determination module 200 looks up the conversion module table 706f to allow selecting a conversion module whose input and output formats are appropriate. The input and output formats are generally determined by MIME and an extension. As shown in FIG. 11, since some data cannot be determined by only the MIME and extension, such as "abstract of the wordprocessor document", an "output format (unique)" is added.

Since the pay conversion module is present, as described with reference to FIG. 11, an item representing a charge per conversion page is also prepared. In this case, the conversion charge is determined per page, but may be determined in accordance with the data size.

FIG. 13 is a view showing the data configuration of a portable terminal performance table 706g. The portable terminal performance table 706g is used to describe the characteristics of the portable terminal. A variety of images can be displayed depending on the types of portable terminals. When an image is to be displayed on user's portable terminal registered in the user portable terminal information table 706d, the portable terminal performance table 706g is looked up to check the image display capacity of the portable terminal specified by the portable terminal model number. Therefore, an image suitable for the portable terminal can be prepared.

Similarly, the maximum number of displayable characters changes depending on the portable terminal. When mail is to be sent to a portable terminal, the maximum number of displayable characters of the portable terminal designated by the portable terminal model number is checked by looking up the portable terminal performance table 706g. Therefore, mail suitable for the portable terminal can be prepared.

The description has been made on an assumption that the mail server 100, determination module 200, conversion module 300 (300'), setting module 500, and net database 400 are present in physically different machines. These components, however, can be present in a single machine. That is, the CPUs 302, 402, 502, and 702 can be a single CPU. In this case, the mail server 100, determination module 200, conversion module 300 (300'), and setting module 500 directly access the storage medium 705 without mediacy of the communication units 204, 304, 404, and 504.

<Outline of System Operation>

To receive a service from the net mail service, the user and user conversion settings must be registered in advance. As described above, according to this embodiment, the user conversion settings are registered via the Web server 700. A sequence about registration of user conversion settings is shown in FIG. 14.

As described above, according to this embodiment, a user is registered in the net mail service when he purchases a portable terminal. Prior to the sequence shown in FIG. 14, the user is registered to retain the user information table 706a and user portable terminal information table 706d.

Figure 14:
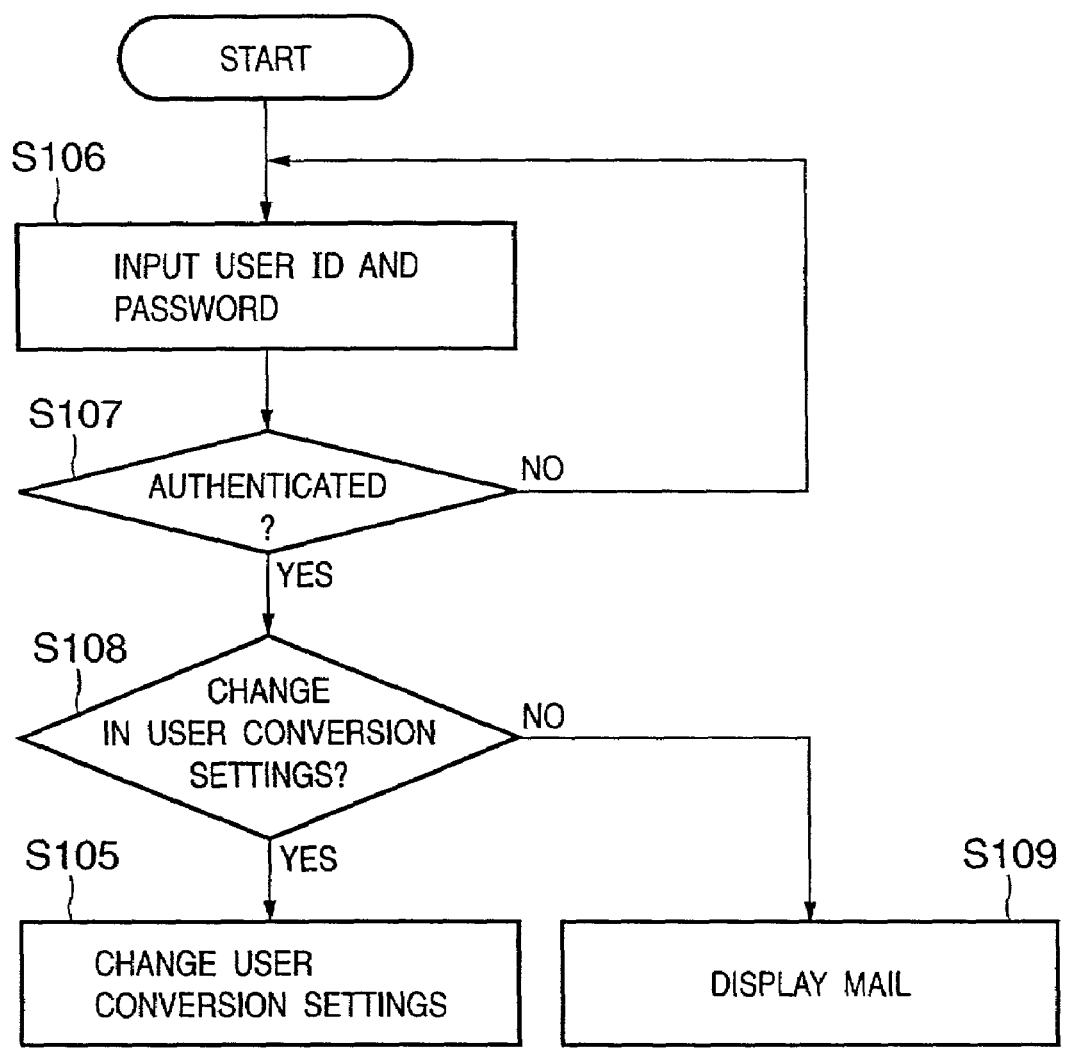
FIG. 14 is a flow chart showing the sequence for registering user conversion settings and displaying mail.

In step S106 of FIG. 14, the user inputs a user ID and password. When the user is determined as an authentic user (step S107), the user selects a change in user conversion settings or mail display by the Web server (step S108). To change the user conversion settings, additional information about the portable telephone, FAX machine, and telephone used to transfer converted mail must be input, and the service contents must be selected (step S105). When the mail display by the Web server is selected, Web mail prepared in accordance with the settings is displayed (step S109).

<Change in Registration of User Conversion Settings>

Figure 15:
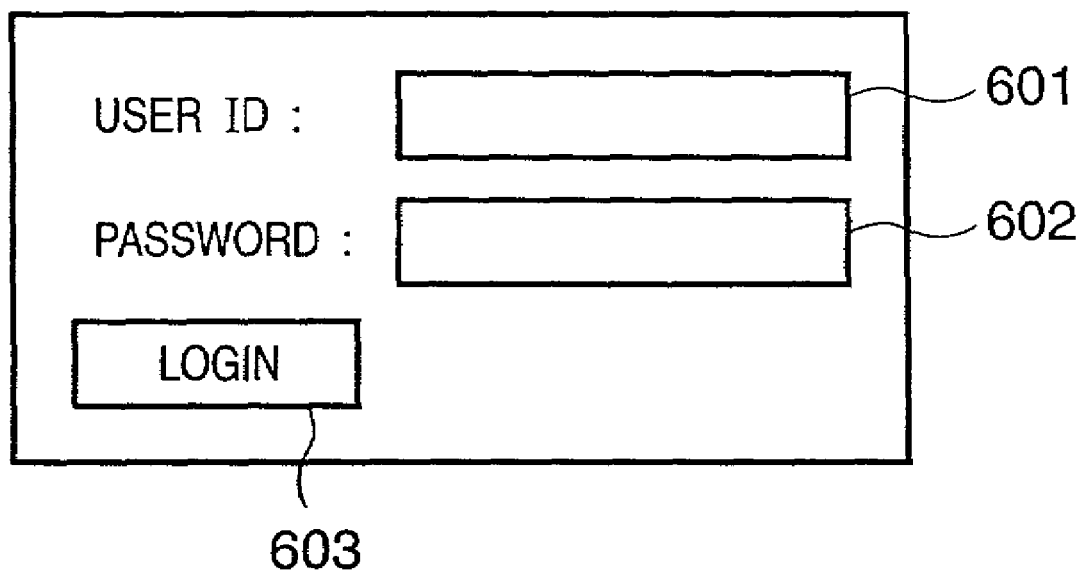
FIG. 15 is a view showing a cover page in a Web server in a net mail service according to this embodiment.
Figure 16:
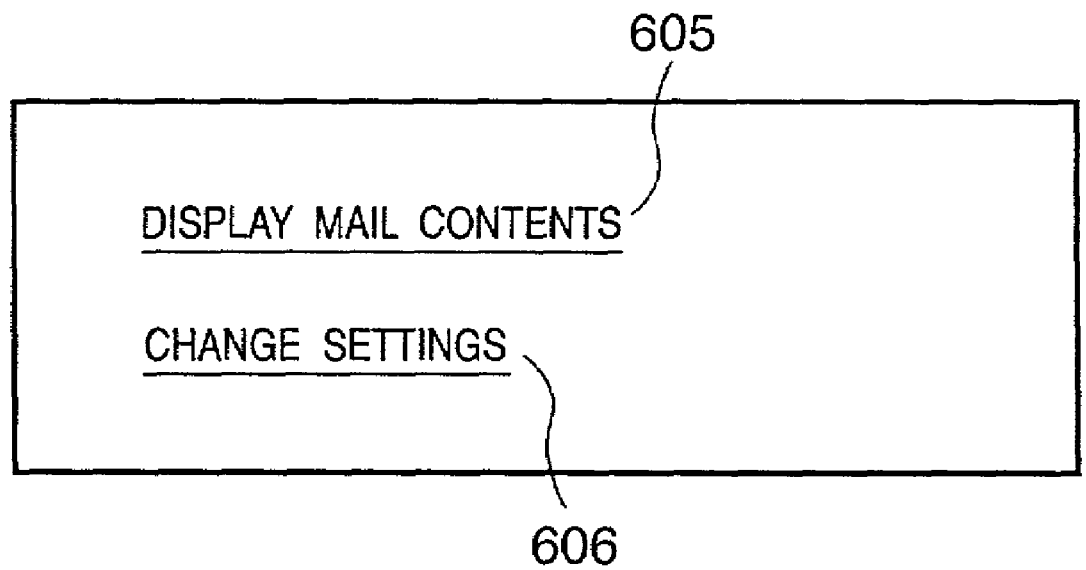
FIG. 16 is a view showing a cover page for user setting in the Web server in the net mail service according to this embodiment.

FIG. 15 shows a cover page in a Web server in the net mail service. The user inputs the user ID in a user ID input box 601 and a password in a password input box 602. When the user then clicks a login button 603, a window shown in FIG. 16 is displayed upon user authentication (steps S106 to S108). When the user clicks a [display mail contents] button 605 in the window shown in FIG. 16, a data display window by the Web (to be described later) is displayed (steps S108 and S106). When the user clicks a "change settings" button 606, a window shown in FIG. 20, which is a window for changing registration of user conversion settings (steps S108 and S105). When the user clicks a "change medium used" button 630 on the window in FIG. 20, a window shown in FIG. 17 is displayed.

Figure 17:
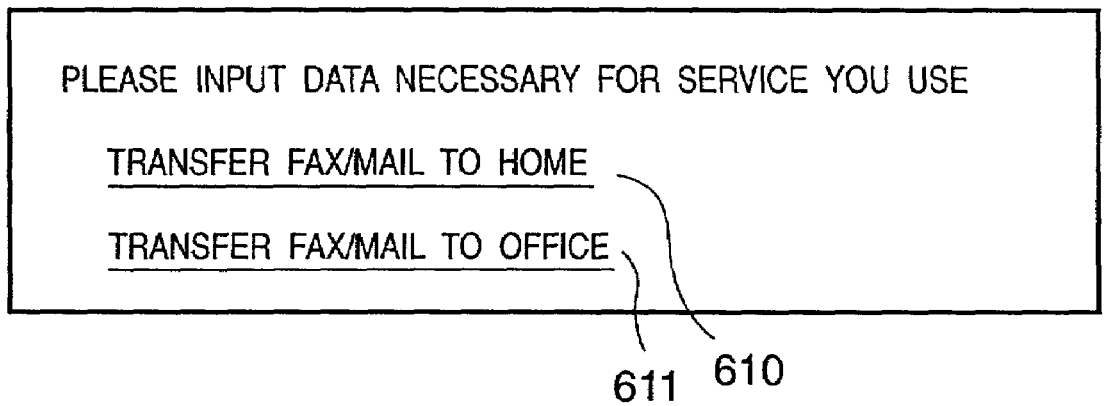
FIG. 17 is a view showing a dialog for designating a transfer destination in the Web server in the net mail service according to this embodiment.
Figure 18:
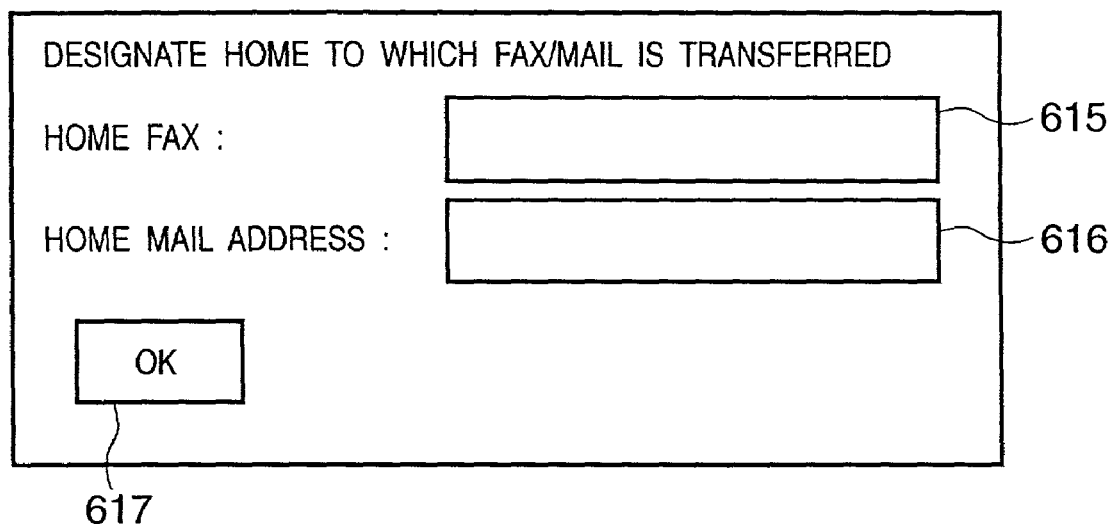
FIG. 18 is a view showing a dialog for designating a transfer destination in the Web server in the net mail service according to this embodiment.

When the user clicks a "transfer FAX/mail to home" button 610 in the window shown in FIG. 17, a setup window shown in FIG. 18 is displayed. The window shown in FIG. 18 is used to input home medium information. A FAX number and mail address are input to a home FAX input box 615 and home mail address input box 616. The user home information table 706b is generated on the basis of the input contents.

When a "transfer FAX/mail to office" button 611 in FIG. 17 is clicked, a setup window in FIG. 19 is displayed. The window in FIG. 19 is used to input office medium information. Pieces of office information are input to input boxes 620 to 626, as needed. The user office information table 706c is generated on the basis of these input contents.

Figure 20:
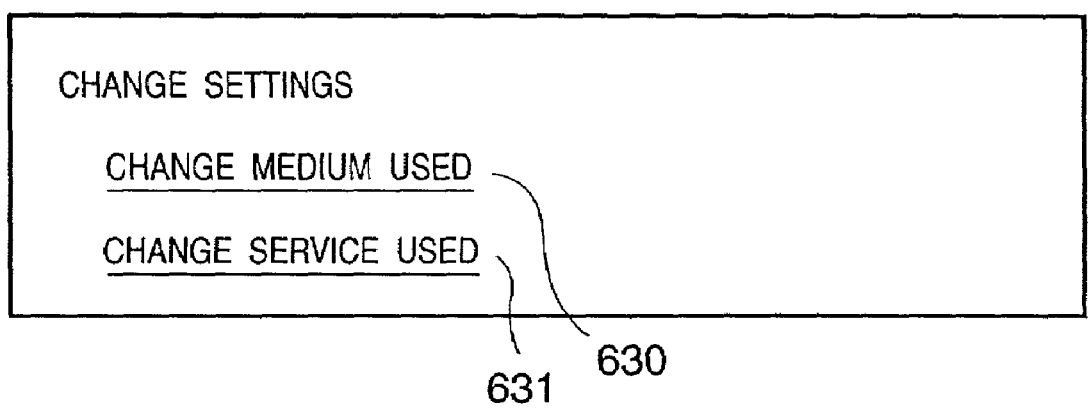
FIG. 20 is a view showing a cover page for changing the user settings in the Web server in the net mail service according to this embodiment.
Figure 21:
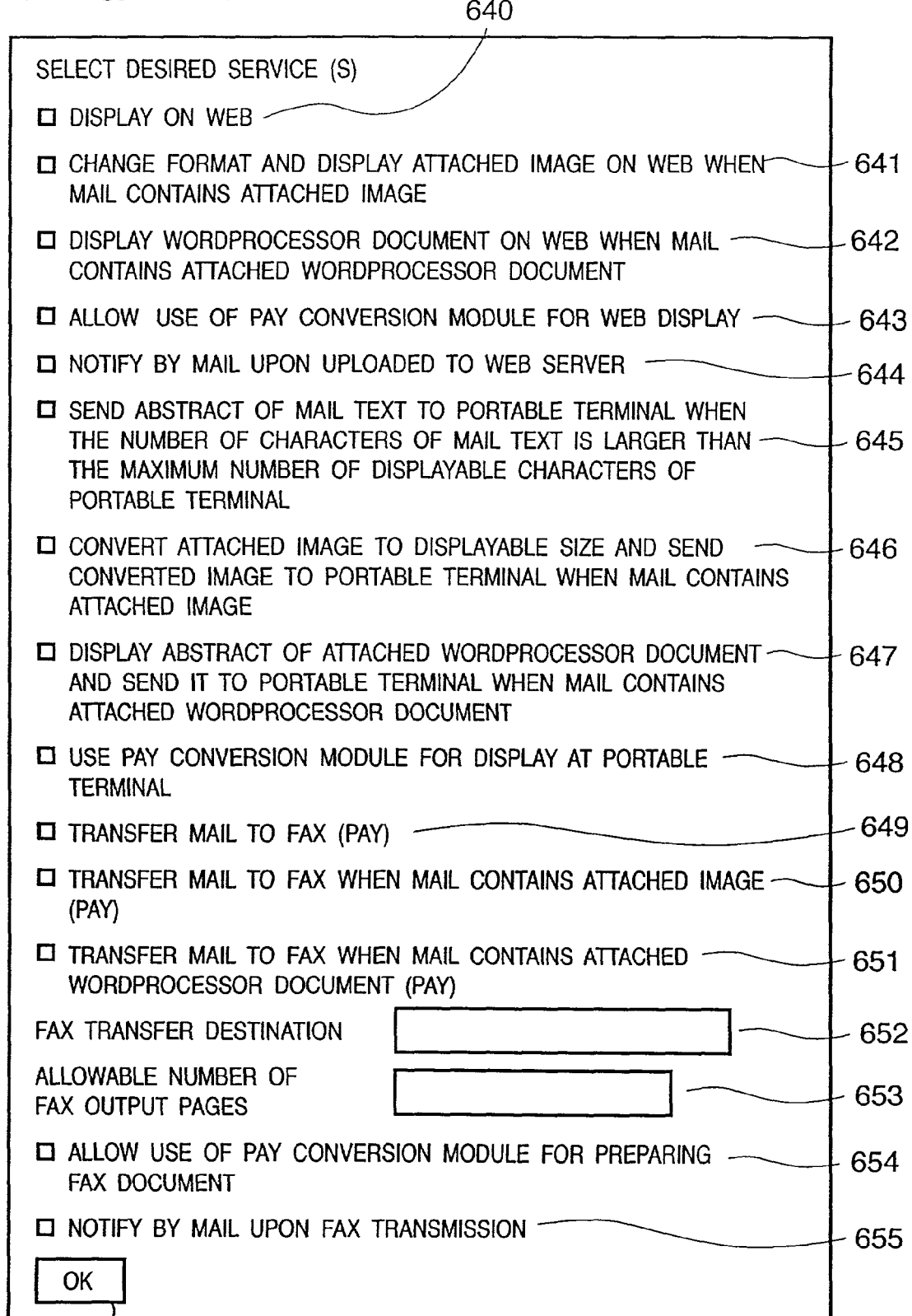
FIG. 21 is a view showing a dialog for selecting services in the Web server in the net mail service according to this embodiment.

When a "change service used" button 631 in FIG. 20 is clicked, a setup window in FIG. 21 is displayed. The window in FIG. 21 is used to set a service desired by a user. Items 640 to 655 are set by the user.

The check boxes 643, 648 and 654 represent items for setting whether a pay conversion module is used for automatic conversion. The check boxes 644 and 655 represent items for setting whether a notification using mail is required when mail is uploaded to the Web server or a wordprocessor document is set to the FAX machine.

A pull-down menu 652 designates a transfer destination when the check box 649 is turned on and a service of transfer to the FAX machine is to be used. One of home and office, a FAX number of which is designated, or the FAX service of the portable terminal can be selected. Since transfer to the FAX machine is a pay service, the maximum number of FAX pages can be designated in the input box 653 in order to prevent output of a large number of FAX pages and to suppress the FAX charge.

<Data Display by Web>

Figure 23:
FIG. 23 is a view showing a display example of reception mail in the Web server in the net mail service according to this embodiment.

A "display mail contents" button 605 is clicked in FIG. 16 to display a window shown in FIG. 22, thereby displaying a list of mail messages converted in accordance with user settings. When one of individual mail messages 660 whose "From" and "Subject" are displayed is selected, the data entity (HTML file and attached image file) stored in the net database is displayed, as shown in FIG. 23. FIG. 23 shows the mail contents converted into the Web format. When the check box 641 in FIG. 21 is turned on, and mail contains an image, the image is displayed in addition to the mail message, as shown in FIG. 23. When the check box 642 in FIG. 21 is turned on, the contents of the wordprocessor document are displayed following the mail text.

<Data Display at Portable Terminal>

When the check box 645 in FIG. 21 is turned on, the maximum number of displayable characters at a portable terminal specified by the portable terminal model number in FIG. 10 is checked by looking up the portable terminal performance table 706g. When the mail text exceeds the maximum number of displayable characters, the abstract of the mail text is prepared and sent. When the check box 646 in FIG. 21 is turned on, image format and size which can be represented at a portable terminal specified by the portable terminal model number in FIG. 10 is checked by looking up the portable terminal performance table 706g. The image attached to the mail is converted into this format, and the converted image is sent. Similarly, when the check box 647 in FIG. 21 is turned on, the abstract of the wordprocessor document is displayed following the mail text. When the mail is uploaded to the Web server or the wordprocessor document is sent to the FAX machine, mail representing this is sent.

<Data Display at FAX Machine>

When one of the check boxes 649, 650, and 651 in FIG. 21 is turned on, only a corresponding one of the mail text, attached image, or attached wordprocessor document is sent by FAX. A cover page representing the destination set in FIGS. 18 and 19 is attached to the FAX for a location designated by the pull-down menu 652.

<Mail Conversion Service>

Figure 24:
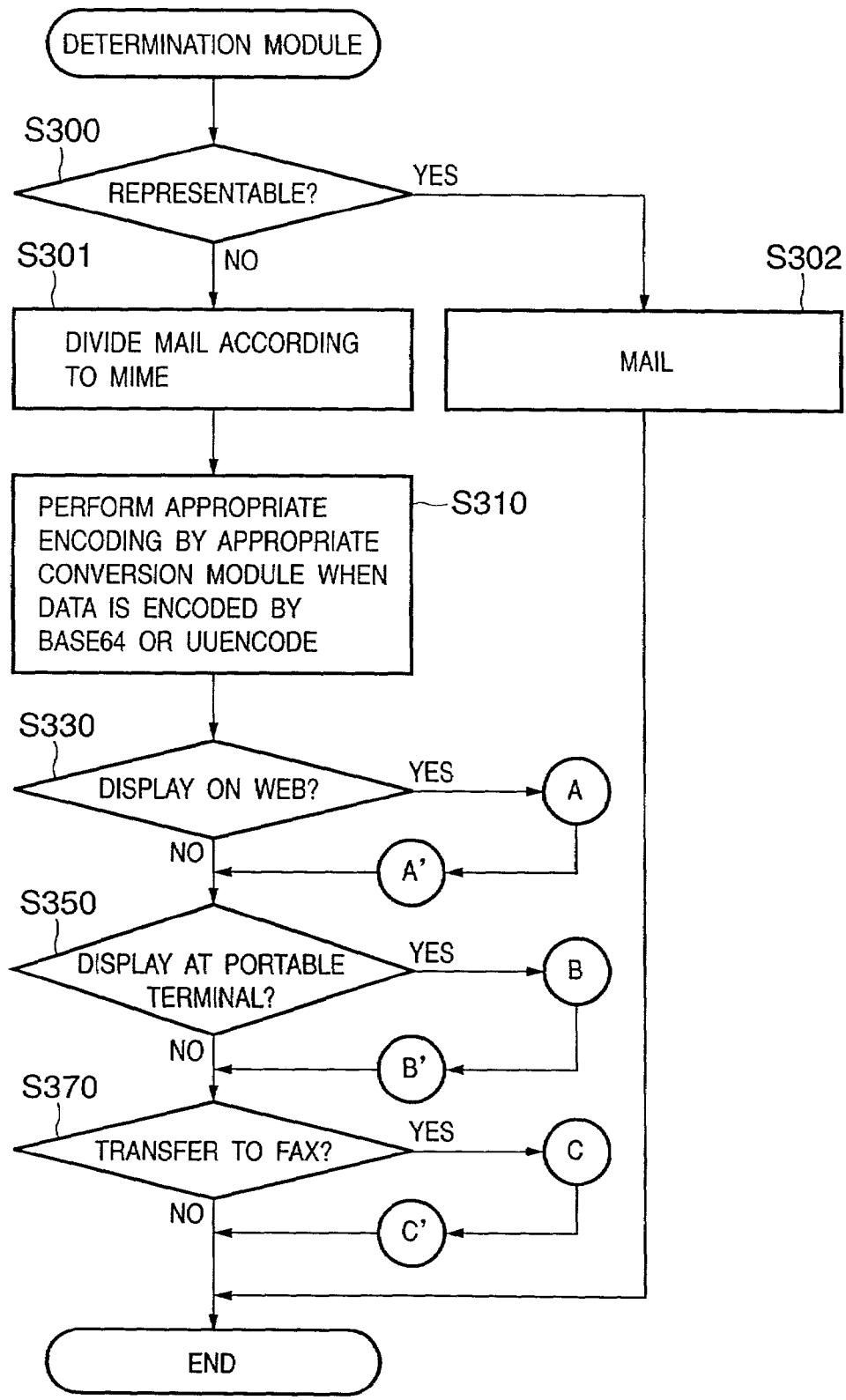
FIG. 24 is a flow chart for explaining processing of the determination module according to this embodiment.

A mail conversion service mechanism for allowing display of data at the Web server, portable terminal, and FAX machine will be described below. FIG. 24 is a flow chart showing the processing flow from reception of mail by the determination module upon reception of the mail by the mail server.

Whether mail can be entirely represented at a portable terminal is determined in accordance with the Content-Type of the mail (step S300). If YES in step S300, the mail is directly sent to the portable terminal (step S302). Whether the mail can be represented at the portable terminal is determined on the basis of the mail contents and the output capacity of the portable terminal at the destination obtained by looking up the user portable terminal information table 706d and portable terminal performance table 706g. When the "Content-Type" of the mail is determined as a multipart, including mail which cannot be represented at the portable terminal, the mail is divided into the parts using "boundary" (step S301). If a conversion module capable of encoding method (normally Base64 or Uuencode) specified in "Content-Transfer-Encoding" is available, the encoded data is decoded (step S310). Conversion for the respective media shown in FIGS. 25, 26A, B, and 27A, B is done. More specifically, to display the mail by the Web server, the flow branches from step S330 to start processing shown in FIG. 25. To display the mail at the portable terminal, the flow branches from step S350 to start processing shown in FIG. 26. To display the mail at the FAX machine, the flow branches from step S370 to start processing shown in FIG. 27.

Whether the mail is displayed by the Web server, portable terminal or FAX machine is determined by acquiring the user ID from the mail recipient, searching the corresponding user conversion setting table 706e on the basis of this user ID, and checking the set contents of the table.

As described with reference to FIG. 1, in a system which provides the fixed service for electronic mail transfer, one conversion table (the user conversion table 700 common to all the users) is arranged in the system, and the set contents of this table are checked. Steps S330 to S370 in the flow chart of FIG. 24 may be omitted, and data conversion processing for a predetermined medium may be done unconditionally.

<<Conversion of Data into Format Displayable by Web>>

Figure 25:
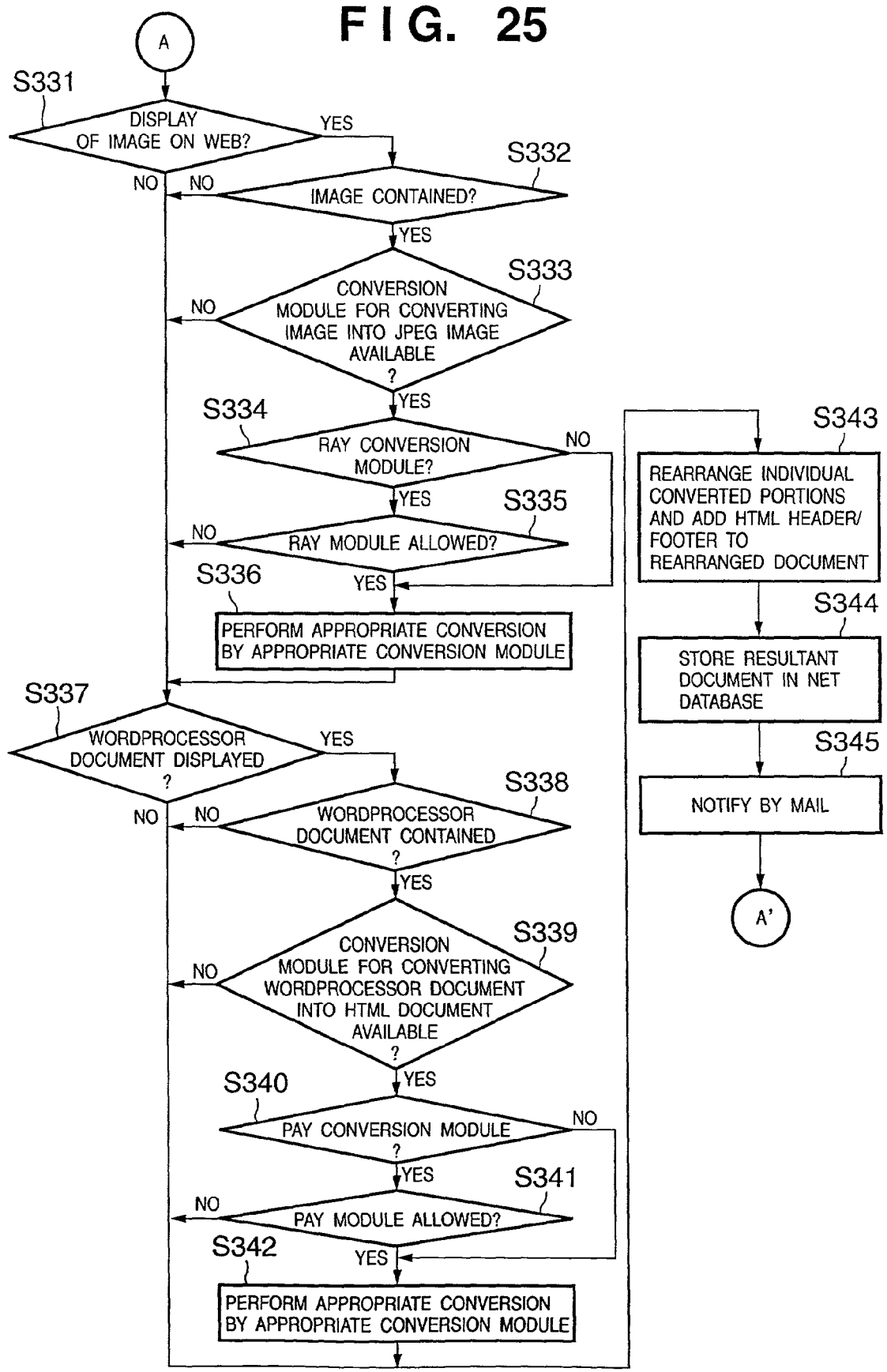
FIG. 25 is a flow chart for explaining processing for preparing data displayable on the Web.

FIG. 25 is a flow chart for forming display data by the Web. The mail text need not be converted, and data to be converted are an image and wordprocessor document attached to the mail. When the user sets to display an image on the Web (step S331), whether the data divided in step S301 contain an image is determined in accordance with the "Content-Type" and name extension (step S332). When the divided data include image data, the "Content-Type" of the image and its name extension are compared with the input formats (MIME) and input formats (extension) of the conversion module table 706f to search for an appropriate conversion module for converting this image into a JPEG image (step S333). If an appropriate conversion module is found, whether price in the conversion module table 706f is set to 0 (zero) is determined (step S334). If the module is a pay module, whether the user allows use of a pay module is checked in accordance with the item of the user conversion setting table 706e (step S335). If the conversion module is free or the user allows use of a pay module, the appropriate conversion module converts the image into the JPEG image (step S336). When the used conversion module is a pay module, the charge for the pay conversion module is added to the charge record of the user information table 706a.

When the user sets to display a wordprocessor document on the Web (step S337), whether the data divided in step S301 include a wordprocessor document is determined in accordance with the "Content-Type" and name extension (step S338). When the divided data include wordprocessor document, the "Content-Type" of the wordprocessor document and its name extension are compared with the input formats (MIME) and input formats (extension) of the conversion module tables 706f to search for an appropriate conversion module for converting this wordprocessor document into an HTML document (step S339). In this embodiment, the wordprocessor document is converted into an HTML document in order to display the wordprocessor document on the Web browser. If an appropriate conversion module is found, whether price of the conversion module table is set to 0 (zero) is determined (step S340). If the module is a pay module, whether the user allows use of a pay module is checked in accordance with the item of the user conversion setting table 706e (step S341). If the conversion module is free or the user allows use of a pay module, the appropriate conversion module converts the wordprocessor document into the HTML document (step S342). When the used conversion module is a pay module, the charge for the pay conversion module is added to the charge record of the user information table 706a.

The individual converted portions and portions not subjected to conversion are rearranged in accordance with the original mail, and an HTML header having the "Subject" content as a title tag is attached to the rearranged data to prepare a Web page (step S343). The resultant Web page is stored in the net database (step S344). A notification representing that the Web page is uploaded to the Web server is mailed to the portable terminal (step S345).

<<Conversion of Display Data for Portable Terminal>>

Figure 26A:
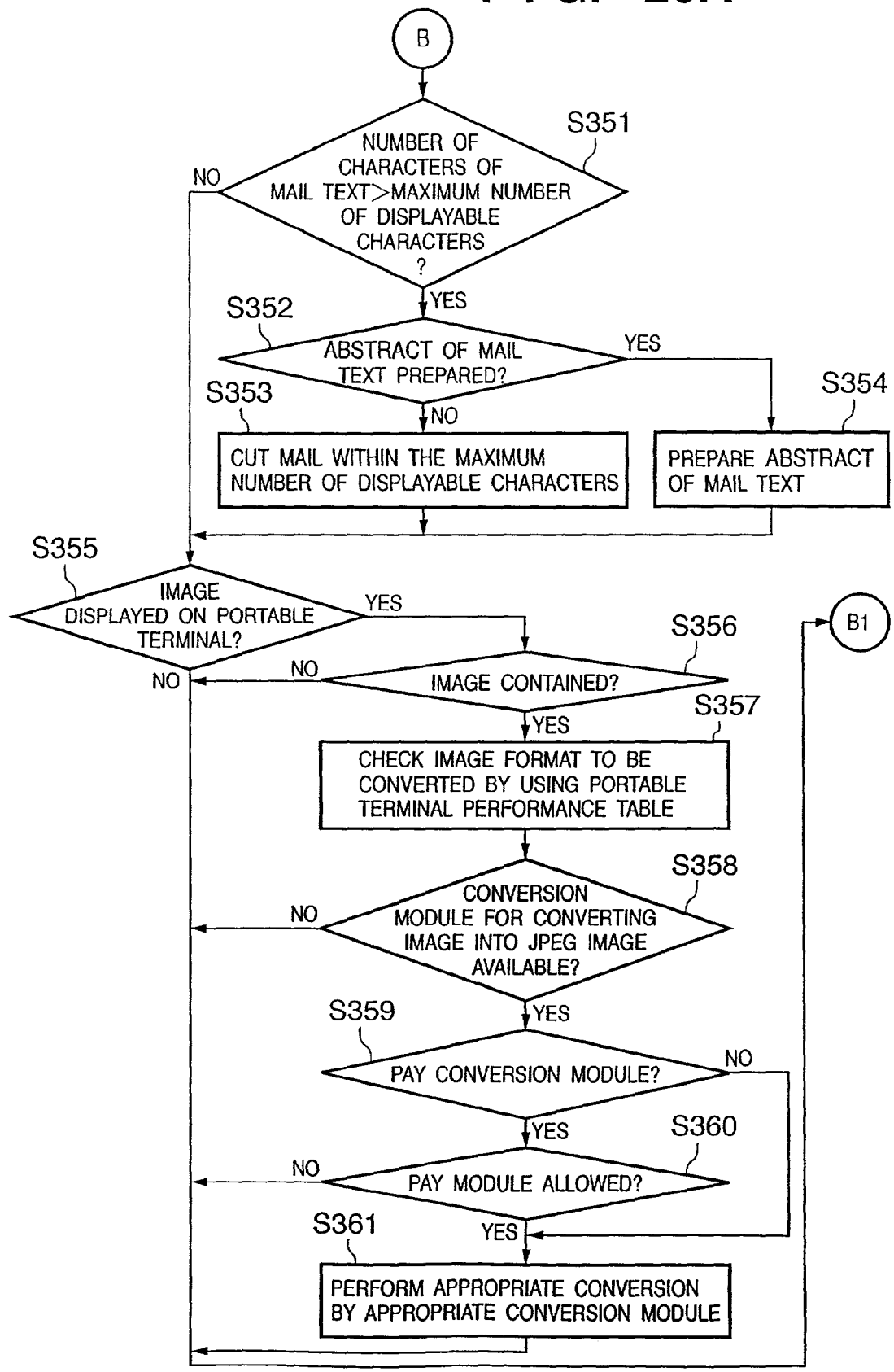
FIGS. 26A and 26B are flow charts for explaining processing for preparing data displayable on a portable terminal.
Figure 26B:
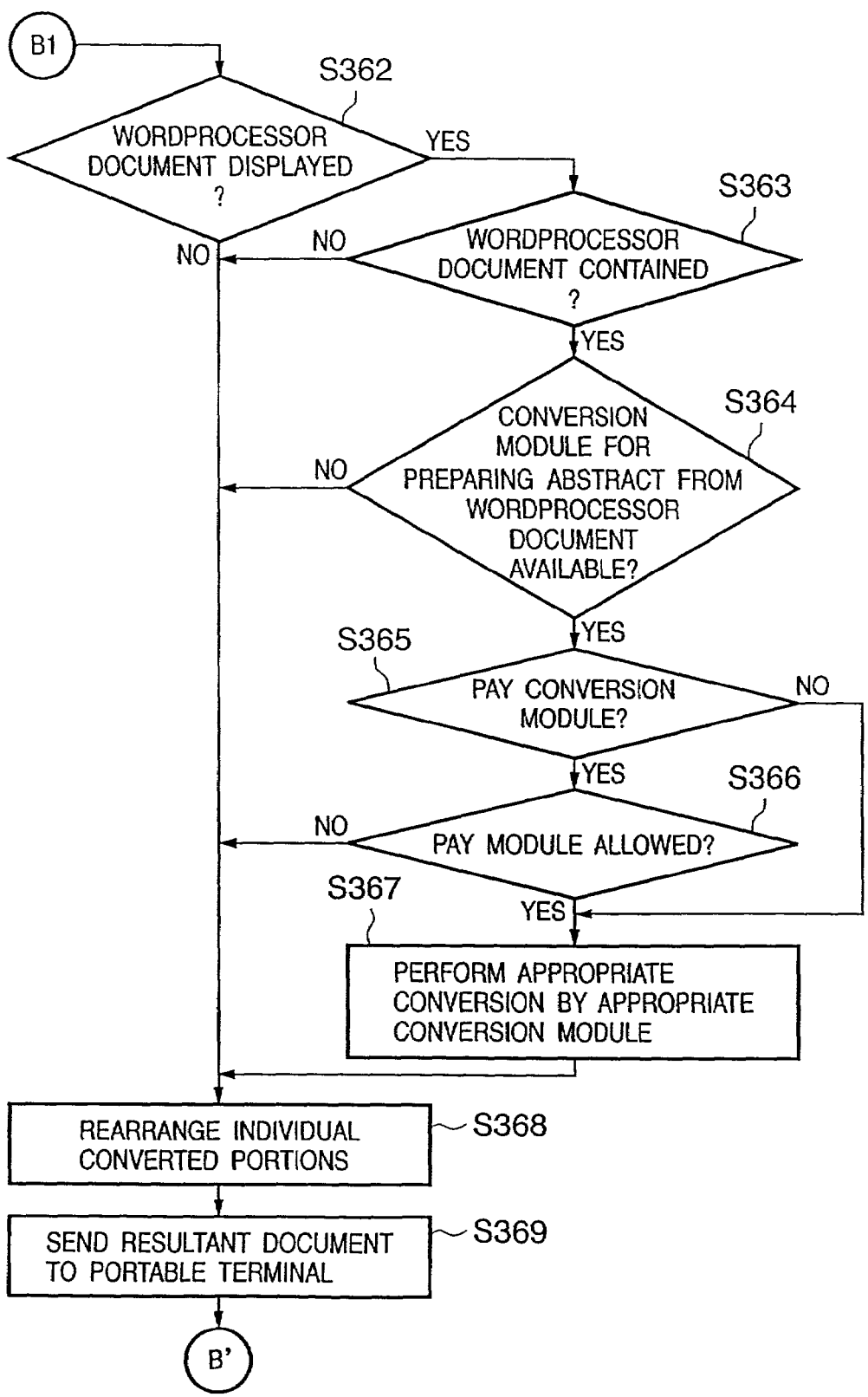

FIGS. 26A and 26B are flow charts for preparing display data on a portable terminal. The maximum number of displayable characters of the portable terminal specified by the portable terminal model number in FIG. 10 is checked by looking up the portable terminal performance table 706g to determine whether the mail text exceeds the maximum number of displayable characters (step S351). If the number of characters of the mail text is larger than the maximum number of displayable characters, whether the abstract of the mail text is prepared is determined in accordance with the user conversion setting table 706e (step S352). If YES in step S352, the abstract of the mail text is prepared by a conversion module (step S353). If settings represent that no abstract is prepared, a character string is cut by a conversion module for cutting part of the character string so as to fit the cut character string within the maximum number of displayable characters (step S354).

When the user sets to display an image on the portable terminal (step S355), whether data divided in step S301 include an image is determined in accordance with the "Content-Type" and name extension (step S356). If the divided data include an image, an image conversion format is checked from the portable terminal performance table 706g (step S357).

The "Content-Type" and name extension of the image are compared with the input formats (MIME) and input formats (extension) of the conversion module table 706f to search for an appropriate conversion module for converting the image into an appropriate format (step S358). Examples of the appropriate image format are GIF (Graphics Interchange Format), PNG (Portable Network Graphics) or BMP (Bit-MaP) currently supported by portable telephones. If another format (e.g., JPEG) is supported in the near future, its image format is included in the appropriate image formats. If an appropriate conversion module is found, whether price of the conversion module table is set to 0 (zero) is determined (step S359). If the module is a pay module, whether the user allows use of a pay module is checked in accordance with the item of the user conversion setting table 706e (step S360). If the conversion module is free or the user allows use of a pay module, the appropriate conversion module performs conversion (step S361). When the used conversion module is a pay module, the charge for the pay conversion module is added to the charge record of the user information table 706a.

When the user sets to display a wordprocessor document on the portable terminal (step S362), whether the data divided in step S301 include a wordprocessor document is determined in accordance with the "Content-Type" and name extension (step S363). When the divided data include wordprocessor document, the "Content-Type" of the wordprocessor document and its name extension are compared with the input formats (MIME) and input formats (extension) of the conversion module tables 706f to search for an appropriate conversion module for preparing abstract from this wordprocessor document into an HTML document (step S364). If an appropriate conversion module is found, whether price of the conversion module table is set to 0 (zero) is determined (step S365). If the module is a pay module, whether the user allows use of a pay module is checked in accordance with the item of the user conversion setting table 706e (step S366). If the conversion module is free or the user allows use of a pay module, the appropriate conversion module performs conversion (step S367). When the used conversion module is a pay module, the charge for the pay conversion module is added to the charge record of the user information table 706a (step S367).

The individual converted portions and portions not subjected to conversion are rearranged in accordance with the original mail, and the document to be sent to the portable terminal is prepared (step S368). The resultant document is sent to the portable terminal designated by the user (step S369).

<<Conversion into Data Transmittable to FAX Machine>>

Figure 27A:
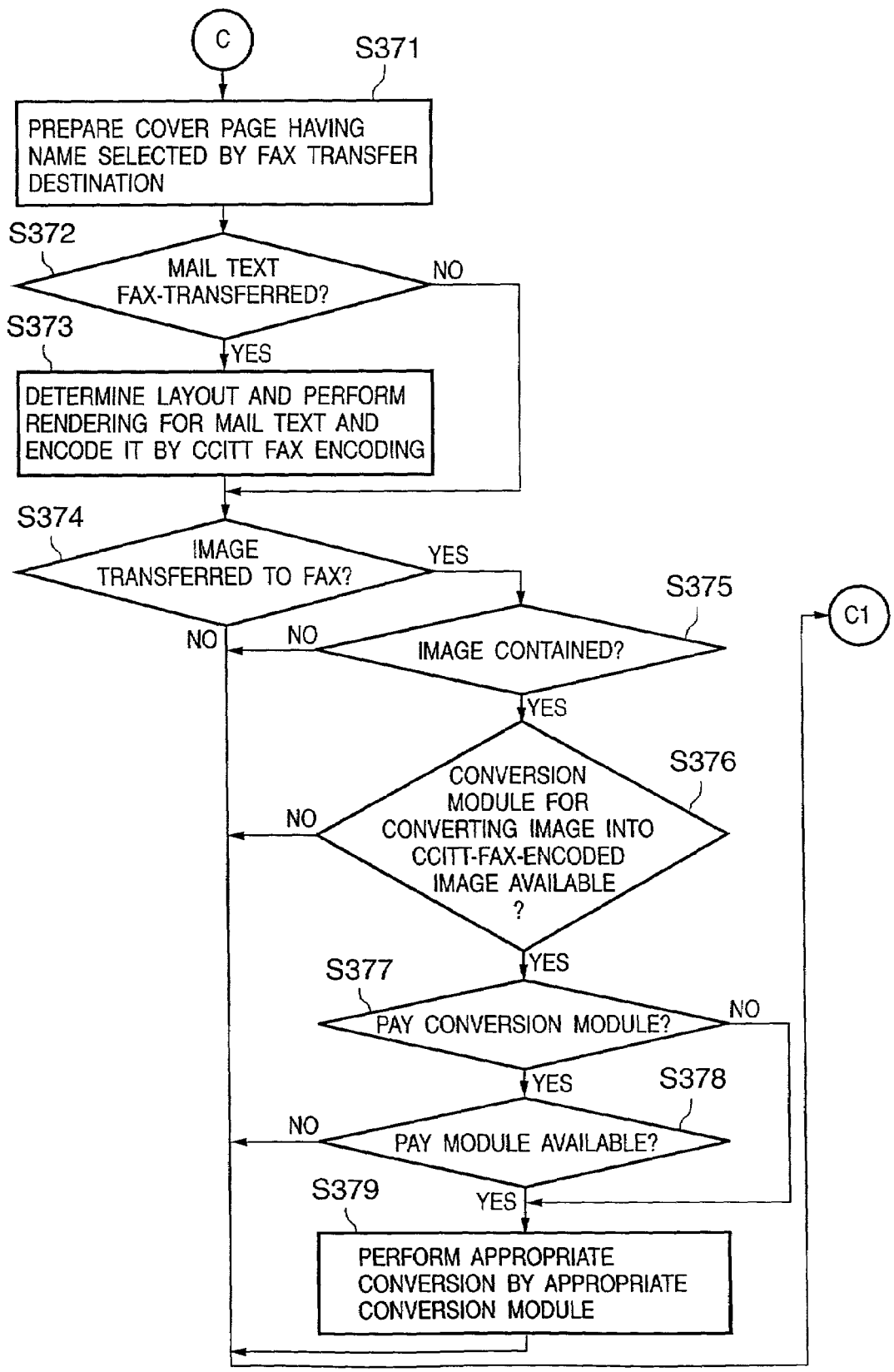
FIGS. 27A and 27B are flow charts for explaining processing for preparing data transmittable to a FAX machine.
Figure 27B:
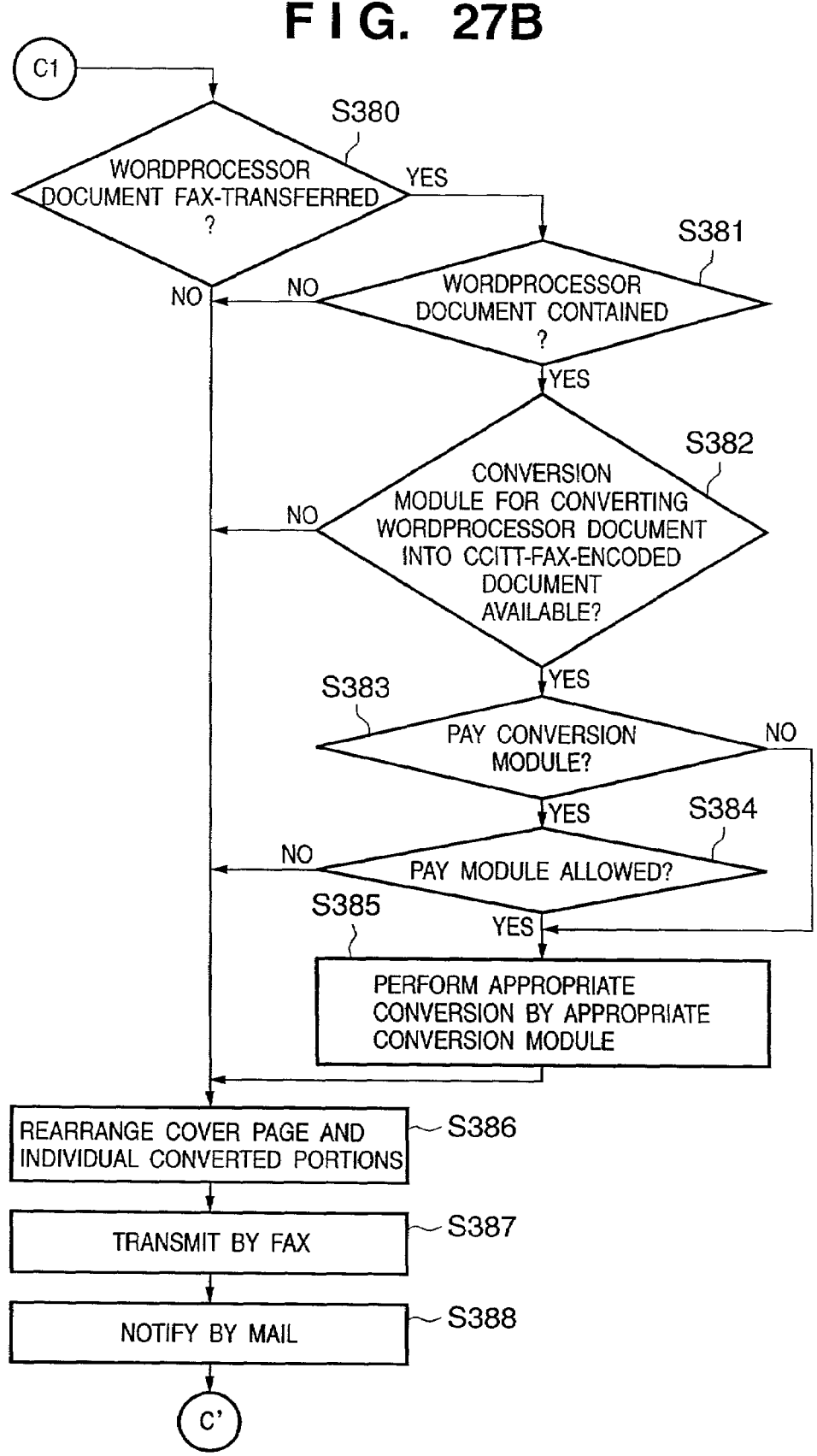

FIGS. 27A and 27B are flow charts for preparing display data to be set via FAX. A cover page representing the location selected for the FAX transfer destination by the user is prepared (step S371). When the user sets to FAX-transmit the mail text, the layout of the mail text is rendered and encoded by CCITT FAX encoding (steps S372 and S373).

When the user sets FAX-transmit an image (step S374), whether the data divided in step S301 include an image is determined in accordance with the "Content-Type" and name extension (step S375). When the divided data include an image, the "Content-Type" of the wordprocessor document and its name extension are compared with the input formats (MIME) and input formats (extension) of the conversion module tables 706f to search for an appropriate conversion module for encoding the image by CCITT FAX encoding (step S376). If an appropriate conversion module is found, whether price of the conversion module table is set to 0 (zero) is determined (step S377). If the module is a pay module, whether the user allows use of a pay module is checked in accordance with the item of the user conversion setting table 706e (step S378). If the conversion module is free or the user allows use of a pay module, the appropriate conversion module performs conversion (conversion into CCITT-FAX-encoded data (step S379). When the used conversion module is a pay module, the charge for the pay conversion module is added to the charge record of the user information table 706a (step S379).

When the user sets to FAX-transmit a wordprocessor document (step S380), whether the data divided in step S301 contain a wordprocessor document is determined in accordance with the "Content-Type" and name extension (step S381). When the divided data include wordprocessor document, the "Content-Type" of the wordprocessor document and its name extension are compared with the input formats (MIME) and input formats (extension) of the conversion module tables 706f to search for an appropriate conversion module for converting this wordprocessor document into CCITT-FAX-encoded data (step S382). If an appropriate conversion module is found, whether price of the conversion module table is free is determined (step S383). If the table is a pay table, whether the user allows use of a pay module is checked in accordance with the item of the user conversion setting table 706e (step S384). If the conversion module is free or the user allows use of a pay module, the appropriate conversion module performs appropriate conversion (step S385). When the used conversion module is a pay module, the charge for the pay conversion module is added to the charge record of the user information table 706a (step S385).

The individual converted portions and portions not subjected to conversion are rearranged in accordance with the original mail, and the cover page is attached to the rearranged data to prepare a document to be sent by FAX (step S386). The resultant document is sent to the FAX machine designated by the user (step S387). A notification representing the FAX number and that the document is sent by FAX is mailed to the portable terminal (step S388).

Steps S332 to S336, S356 to S361, and S375 to S379 are repeated by the number of images. When pay modules and free modules are mixed, and use of a pay module is not allowed, images convertible by free modules are converted into data for transfer.

Steps S338 to S342, S363 to S367, and S381 to S385 are repeated by the number of wordprocessor documents. When pay modules and free modules are mixed, and use of a pay module is not allowed, wordprocessor documents convertible by free modules are converted into data for transfer.

As described above, according to this embodiment, user information (user portable terminal information table 706d and user conversion setting table 706e) including information about the portable terminal and designation of a destination for electronic mail is retained for each user. The determination module 200 determines whether the contents of electronic mail received by the mail server 100 are displayable at the portable terminal of the destination user (representation enable/disable determination program). If the electronic mail is determined to be displayable upon this determination, the electronic mail is sent to the designated portable terminal (steps S300 and S302). If the electronic mail is determined not to be displayable, the destination of the electronic mail is determined in accordance with the contents of the user conversion setting table 706e (steps S330, S350, and S370), and output data outputtable at the destination is generated on the basis of the data of the electronic mail (FIGS. 25 to 27). The output data is provided to the destination, and a notification representing this is sent to inform the portable terminal (steps S344, S345, S387, and S388).

According to this embodiment, when information which cannot be displayed under a portable terminal environment for receiving electronic mail is transmitted to a user, abstract of this mail and a method of acquiring it are notified to the user via the portable terminal. Information which cannot be displayed due to the limitations of the portable terminal environment can be provided to the user in a variety of forms. The electronic mail use environment using portable terminals can be greatly improved.

<Other Embodiment>

The object of the present invention can also be achieved by supplying a storage medium which stores software program codes for implementing the functions of the above-described embodiments to a system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, DVD or the like can be used.

The functions of the above-described embodiment are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, limitations on the contents of transmission information can be reduced and a variety of information providing modes are available in use of data communication with portable terminals.

As many apparently widely different embodiments of the present invention can be made without departing from the spirit and scope thereof, it is to be understood that the invention is not limited to the specific embodiments thereof except as defined in the appended claims.

What is claimed is:

1. An information providing apparatus comprising:

a management unit managing settings indicating whether or not to generate abstract of mail text of an electronic mail and maximum number of displayable characters of a communication terminal by associating the settings with address of electronic mail;

a reception unit receiving electronic mail data addressed to a communication terminal;

a first determining unit determining, by referring to the management unit, whether the number of characters of mail text of the electronic mail data received by said reception unit exceeds the maximum number of displayable characters of the addressed communication terminal;

a second determination unit determining, when said first determination unit determines that the number of characters of the mail text exceeds the maximum number of displayable characters, whether settings corresponding to the addressed communication terminal indicates that an abstract is to be generated, by referring to the management unit;

a first generation unit generating, when said second determination unit determines that the setting indicates to generate an abstract, an abstract of the mail text as text to be sent;

a second generation unit generating, when said second determination unit determines that the setting indicates not to generate an abstract, text to be sent by cutting characters which exceed the maximum number of displayable characters; and a sending unit sending the text to be sent generated by said first or second generation unit to the addressed communication terminal.

2. The apparatus according to claim 1, wherein the communication terminal includes a portable telephone.

3. An information providing method comprising:

a management step of managing settings indicating whether or not to generate abstract of mail text of an electronic mail and maximum number of displayable characters of a communication terminal by associating the settings with address of electronic mail;

a reception step of receiving electronic mail data addressed to a communication terminal;

a first determination step of determining, by referring to the managing in the management step, whether the number of characters of mail text of the electronic mail data received in said reception step exceeds the maximum number of displayable characters of the addressed communication terminal;

a second determination step of determining, when it is determined in said first determination step that the number of characters of the mail text exceeds the maximum number of displayable characters, whether settings corresponding to the addressed communication terminal indicates that an abstract is to be generated, by referring to the managing in the managing step;

a first generation step of generating an abstract of the mail text as text to be sent when it is determined in said second determination step that the setting indicates to generate an abstract;

a second generation step of generating text to be sent by cutting characters which exceed the maximum number of displayable characters, when it is determined in said second determination step that the setting indicates not to generate an abstract; and a sending step of sending the text generated in said first or second generation step to the addressed communication terminal.

4. The method according to claim 3, wherein the communication terminal includes a portable telephone.

5. A computer program stored on a computer-readable storage medium for causing a computer to execute the information providing method of claim 3.

6. A computer program stored on a computer-readable storage medium in accordance with claim 5, wherein the communication terminal includes a portable telephone.

7. A computer readable storage medium storing a computer-executable program for causing a computer to execute the information providing method of claim 3.

8. A computer readable storage medium storing a computer-executable program in accordance with claim 7, wherein the communication terminal includes a portable telephone.

* * * * *